US006606188B2

(12) United States Patent
Shimojoh

(10) Patent No.: US 6,606,188 B2
(45) Date of Patent: Aug. 12, 2003

(54) OPTICAL REPEATER USING RAMAN AMPLIFICATION, WAVELENGTH DIVISION MULTIPLEXED LIGHT TRANSMISSION SYSTEM, EXCITATION LIGHT SUPPLY METHOD AND EXCITATION LIGHT CONTROL METHOD FOR RAMAN AMPLIFICATION

(75) Inventor: Naomasa Shimojoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/963,467

(22) Filed: Sep. 27, 2001

(65) Prior Publication Data

US 2002/0122242 A1 Sep. 5, 2002

(30) Foreign Application Priority Data

Mar. 2, 2001 (JP) ........................................ 2001-058544

(51) Int. Cl.[7] ................................................ H01S 3/00

(52) U.S. Cl. .............. 359/334; 359/341.31; 359/341.32

(58) Field of Search ............................ 359/334, 341.31, 359/341.32

(56) References Cited

U.S. PATENT DOCUMENTS

| | | | | |
|---|---|---|---|---|
| 5,241,414 A | * | 8/1993 | Giles et al. .................. | 359/341 |
| 5,581,397 A | | 12/1996 | Uzuki et al. ................. | 359/205 |
| 6,008,934 A | * | 12/1999 | Fatehi et al. ................ | 359/341 |
| 6,236,777 B1 | * | 5/2001 | Ravasio et al. .............. | 385/24 |

FOREIGN PATENT DOCUMENTS

| | | |
|---|---|---|
| EP | 0910140 A2 | 4/1999 |
| JP | 5-268166 | 10/1993 |

(List continued on next page.)

OTHER PUBLICATIONS

Yoshihiro Emori, et al., "100nm Bandwidth Flat Gain Raman Amplifiers Pumped and Gain Equalized by 12–Wavelength–channel WDM high power laser diodes", OFC '99, DP19–1~PD19–3., 1999.

Naomasa Shimojoh, et al., "1.22 Tbits/s WDM Transmission Over 7,221 km with 38–nm Bandwidth Expanded by Distributed Raman Amplifier and EDFA", Optical Fiber Communication Conference 2001.

(List continued on next page.)

Primary Examiner—Mark Hellner
(74) Attorney, Agent, or Firm—Staas & Halsey LLP

(57) ABSTRACT

The present invention is aimed at providing an optical repeater using Raman amplification that can Raman amplify WDM signal lights propagated through a plurality of transmission systems, with high excitation efficiency and stability. To this end, an optical repeater using Raman amplification of the present invention multiplexes and demultiplexes excitation lights supplied from a plurality of excitation light sources in a star coupler and then supplies the resultant demultiplexed lights to Raman amplification media of a plurality of transmission systems via optical multiplexers, to thereby Raman amplify the WDM signal lights of the respective transmission systems. Moreover, by feedback controlling the power of each excitation light based on the result of monitoring the WDM signal light power after Raman amplification in each transmission system, a stabilized Raman amplification operation with reduced dispersion in the power of each excitation light output from the star coupler is realized.

18 Claims, 17 Drawing Sheets

FOREIGN PATENT DOCUMENTS

| | | |
|---|---|---|
| JP | 5-316042 | 11/1993 |
| JP | 6-314833 | 11/1994 |
| JP | 7-176813 | 7/1995 |
| JP | 8-054580 | 2/1996 |
| JP | 8-304860 | 11/1996 |
| JP | 2714611 | 2/1998 |
| JP | 11-121849 | 4/1999 |
| JP | 2000-49405 | 2/2000 |
| JP | 2000-98433 | 4/2000 |
| JP | 2000-114625 | 4/2000 |

OTHER PUBLICATIONS

Morten Nissov, et al., "100 Gb/s (10×10Gb/s) WDM Transmission Over 7200 km Using Distributed Raman Amplification", ECOC 97, Conference Publication No. 448, Sep. 22–25, 1997, pp. 9–12, OIEE, 1997.

Shingo Kawai, et al., Wide Bandwidth and Long Distance WDM Transmission Using Highly Gain–Flattened Hybrid Amplifier, OFC '99, FC3–1 ~ FC3–3, 1999.

* cited by examiner

OPTICAL REPEATER USING RAMAN AMPLIFICATION, WAVELENGTH DIVISION MULTIPLEXED LIGHT TRANSMISSION SYSTEM, EXCITATION LIGHT SUPPLY METHOD AND EXCITATION LIGHT CONTROL METHOD FOR RAMAN AMPLIFICATION

BACKGROUND OF THE INVENTION

1. Field of the Invention

The present invention relates to an optical amplifying-and-repeating technique for collectively amplifying wavelength division multiplexed (WDM) signal lights transmitted through an optical transmission path. In particular, the invention relates to an optical repeater using Raman amplification and a WDM optical transmission system and the like for Raman amplifying WDM signal lights propagated through a plurality of transmission systems.

2. Description of Related Art

In a conventional WDM optical amplifying-and-repeating transmission system wherein a WDM optical transmission system and an optical amplifying-and-repeating transmission system are combined, it is possible to collectively amplify optical signals having two or more different wavelengths by using optical amplifiers, and also possible to realize high capacity and long distance optical transmission using a simple (economical) structure.

A typical WDM optical amplifying-and-repeating transmission system comprises, for example as shown in FIG. 18, an optical sender system 100 for converting electrical signals into optical signals, a transmission system 110 having a constitution wherein an optical fiber transmission path for transmitting optical signals and an optical amplification repeater for amplifying those optical signals to compensate for losses in the transmission path to send them to a next optical transmission path are repeatedly combined with each other, and an optical receiver system 120 for demodulating the optical signals to electrical signals.

In the above mentioned WDM optical amplifying-and-repeating transmission system, as a conventional WDM optical amplifier to be applied as an optical amplification repeater or the like of the transmission system 110, for example, there is known a method for amplifying WDM signal lights collectively by using an optical fiber amplifier wherein excitation light is supplied to an optical fiber doped with a rare earth element (rare earth element doped fiber amplifier; REDFA). This REDFA has a characteristic that the signal light band is limited by the optical amplification band to be determined depending on the doped element.

Alternatively, a Raman amplifier utilizing simulated Raman scattering can amplify a wider signal light wavelength band than the REDFA, and there is a prospect of application to future optical amplification repeaters. However, since the abovementioned Raman amplifier requires comparatively greater excitation light power than the REDFA, for example when applied to a system in which repeater power consumption is limited, such as an undersea cable system and the like, it is important to supply excitation light to the Raman amplifier effectively.

The construction of a conventional Raman amplifier is, for example, disclosed in Japanese Unexamined Patent Publication No. 2000-98433. In this conventional Raman amplifier, excitation lights of required wavelengths, output from a plurality of excitation light sources that are constituted by using semiconductor lasers of Fabry-Perot type or the like, are multiplexed to be supplied to the Raman amplification media.

Incidentally, for optical amplification repeaters used in WDM optical amplifying-and-repeating transmission systems, it is required to not only amplify a WDM signal light transmitted in one direction, but also to amplify a WDM signal light propagated through other transmission path for increasing transmission capacity, or to amplify WDM signal lights transmitted in both the ascending direction and descending direction. The realization of such a requirement is especially important for undersea cable systems and the like.

Prior art In which an optical amplification repeater that can amplify WDM signal lights in both ascending and descending directions is realized using a REDFA is described in, for example, Japanese Unexamined Patent Publications No. 5-268166, No. 6-314833, No. 7-176813, No. 8-54580, No. 8-304860, No. 2000-49405 and No. 2000-114625 and the like.

However, at the present time, a technique to realize an optical amplification repeater coping with a plurality of transmission systems by using the Raman amplifier has not been realized. The Raman amplifier can amplify a wider signal light wavelength band than the REDFA as mentioned before, and it is highly usable to realize an optical amplification repeater that will cope with a plurality of transmission systems.

If an optical amplification repeater coping with a plurality of transmission systems is to be realized by applying a conventional Raman amplifier as described above, since the conventional structure is for amplifying a WDM signal light propagated through one optical fiber (one transmission system), individual Raman amplifiers must be installed corresponding to each transmission system. Therefore, it is necessary to drive a number of excitation light sources for Raman amplification. However, such a structure of optical amplification repeater is not realistic for an undersea cable system and the like in which power consumption is limited, and hence the problem of improving excitation efficiency needs to be solved.

Furthermore, in a case where WDM signal lights of a plurality of transmission systems are Raman amplified by one optical amplification repeater, if Raman amplification operation is not controlled such that in each transmission system, important parameters, such as total output light power of the repeater, optical power (or gain) in signal light wavelength bands corresponding to excitation light wavelengths, optical power (or gain) deviations and the like, are all within allowable ranges, there is a possibility that WDM signal lights of all of the transmission systems cannot be transmitted under required error rates, which is a problem.

SUMMARY OF THE INVENTION

The present invention addresses the abovementioned points, with the object of providing a technique related to optical repeaters using Raman amplification and the like that enables Raman amplification of WDM signal lights that are propagated through a plurality of transmission systems, with high excitation efficiency and stability.

To achieve the abovementioned object, an optical repeater using Raman amplification according to the present invention, which supplies excitation light to a Raman amplification medium of each one of a plurality of transmission systems transmitting WDM signal lights, and Raman amplifies each WDM signal light transmitted through each of the transmission systems, comprises: a plurality of excitation light generation sections for generating excitation lights of different wavelengths corresponding to the wavelength bands of the WDM signal lights; an optical multiplexing/demultiplexing section having a plurality of input ports corresponding to the respective excitation light generation sections, and a plurality of output ports corresponding to the respective transmission systems, for multiplexing excitation lights input to the input ports from the excitation light generation sections, and demultiplexing the multiplexed excitation light for output from the output ports; and a plurality of excitation light multiplexing sections for supplying excitation lights output from the respective output ports of the optical multiplexing/demultiplexing section to the Raman amplification media of the respective transmission systems, respectively.

In such a construction, excitation lights of different wavelengths generated in the plurality of excitation light generation sections are multiplexed and then demultiplexed corresponding to the number of the plurality of transmission systems in the optical multiplexing/demultiplexing section and then supplied to the Raman amplification media of the respective transmission systems, and the WDM signal light propagated through each Raman amplification medium is Raman amplified. As a result, a plurality of excitation lights are supplied to the Raman amplification media of the respective transmission systems with no loss and in balance, so that WDM signal lights propagated through a plurality of transmission systems can be Raman amplified with high excitation efficiency, thus enabling the realization of a small-sized optical repeater using Raman amplification with low power consumption.

Furthermore, it is preferable that, the abovementioned optical repeater using Raman amplification is provided with signal light power detecting section for detecting WDM signal light powers after Raman amplification in the respective transmission systems, and a control section for controlling the excitation light power output from each of the excitation light generation sections based on the detection result of the signal light power detecting section.

According to such a construction, based on the WDM signal light power after Raman amplification in each transmission system, the power of each excitation light to be transmitted to the optical multiplexing/demultiplexing section is feedback controlled. As a result, an influence on Raman amplification operation by the dispersion of the excitation light power output from the optical multiplexing/demultiplexing section and the characteristic variation of optical transmission paths and the like can be reduced, thus enabling stable Raman amplification of respective WDM signal lights propagated through a plurality of transmission systems.

A specific structure of the abovementioned optic repeater, using Raman amplification may be such that the signal light power detecting section detects the total optical power of WDM signal light after Raman amplification in each of the transmission systems, and the control section is provided with a mean value computation section for computing a mean value of the total optical power of each transmission system, which is detected in the signal light power detecting section, a comparison section for obtaining a difference between a preset target mean value and the mean value of the total optical power computed in the mean value computation section; and an excitation light power control section for controlling the excitation light power output from each of the excitation generation sections according to the difference value obtained in the comparison section. Furthermore, it is preferable that the abovementioned control section has a correction section for performing weighting correction on the difference value obtained in the comparison section corresponding to each of the excitation light generation sections, and that the excitation light power control section controls the excitation light power output from each of the excitation light generation sections according to the value weighting corrected in the correction section.

According to such a construction, the power of each excitation light is feedback controlled such that the mean value of the total optical power of the WDM signal lights after Raman amplification in the respective transmission systems approaches a target value set in advance. Furthermore, if a correction section is installed to perform weighting correction corresponding to each excitation light generation section, it is possible to control the excitation light power with high accuracy taking into consideration a change in Raman gain different for each wavelength of each excitation light.

Another specific structure of the abovementioned optical repeater using Raman amplification may be such that the signal light power detecting section divides the wavelength division multiplexed signal light after Raman amplification in each of said transmission systems into gain wavelength bands corresponding to the excitation light wavelength of each of said excitation light generation sections, and detects the optical powers of said signal lights for each of the gain wavelength bands and the control section is provided with a mean value computation section for gathering the optical power for each of the gain wavelength bands in each transmission system detected in the signal light power detecting section and computing a mean value, a comparison section for obtaining a difference between a target mean value set in advance corresponding to the gain wavelength band and the mean value of the optical power for each of the gain wavelength bands computed in the mean value computation section, and an excitation light power control section for controlling the excitation light power output from each of the excitation light generation sections according to the difference value for each of the gain wavelength bands, obtained in the comparison section.

According to such a construction, the WDM signal light power after Raman amplification in each transmission system is monitored for each gain wavelength band corresponding to each of the excitation light wavelengths, to obtain the mean value, and the power of each excitation light is feedback controlled such that the mean value of each gain wavelength band approaches the target value.

Another specific structure of the abovementioned optical repeater using Raman amplification may be such that the signal light power detecting section divides the wavelength division multiplexed signal light after Raman amplification in each of said transmission systems into gain wavelength bands corresponding to the excitation light wavelength of each of said excitation light generation sections, and detects optical powers of said signal lights for each of the gain wavelength bands, and the control section is provided with a comparison section for obtaining, for the optical power of each transmission system detected in the signal light power detecting section, differences of the optical powers of the other gain wavelength bands to the optical power of a reference gain wavelength band set in advance, a mean value computation section for gathering difference values obtained by the comparison section for each of the gain wavelength bands and computing a mean value, and an excitation light power control section for controlling the excitation light power output from each of the excitation light generation sections according to the mean value of the differences of the respective gain wavelength bands, computed in the mean value computation section.

According to such a construction, the WDM signal light power after Raman amplification in each transmission system is monitored for each gain wavelength band corresponding to each of the excitation light wavelengths, and differences of the optical powers of the other gain wavelength bands to the optical power of the reference gain wavelength band are obtained. Then, the mean value of the differences in the respective transmission systems is computed for each gain wavelength band, and the power of each excitation light is feedback controlled based on the computation result. As a result, it is also possible to compensate for deterioration of characteristics with age.

The abovementioned optical repeater using Raman amplification may be such that the signal light power detecting section selects any one of the plurality of transmission systems and detects the power of the WDM signal light after Raman amplification, and the control section controls the power of the excitation light output from each of the excitation light generation sections based only on the detection result for the transmission system selected in the signal light power detecting section. According to such a construction, the feedback control of the excitation light power corresponding to the gain wavelength band is performed only for the transmission system selected from among a plurality of transmission systems.

The optical repeater using Raman amplification as described above has a plurality of transmission systems for transmitting WDM signal lights between transmitting terminals and receiving terminals, and in a WDM optical transmission system provided with an optical repeater on the optical transmission path of each transmission system, is suitable as an optical repeater.

Other objects, features and advantages of this invention will become apparent in the following description of embodiments in relation to the accompanying drawings.

DETAILED DESCRIPTION OF THE INVENTION

As follows is a description of embodiments of the present invention based on drawings.

Firstly, a first embodiment showing a basic structure of an optical repeater using Raman amplification according to the present invention will be described.

Figure 1:
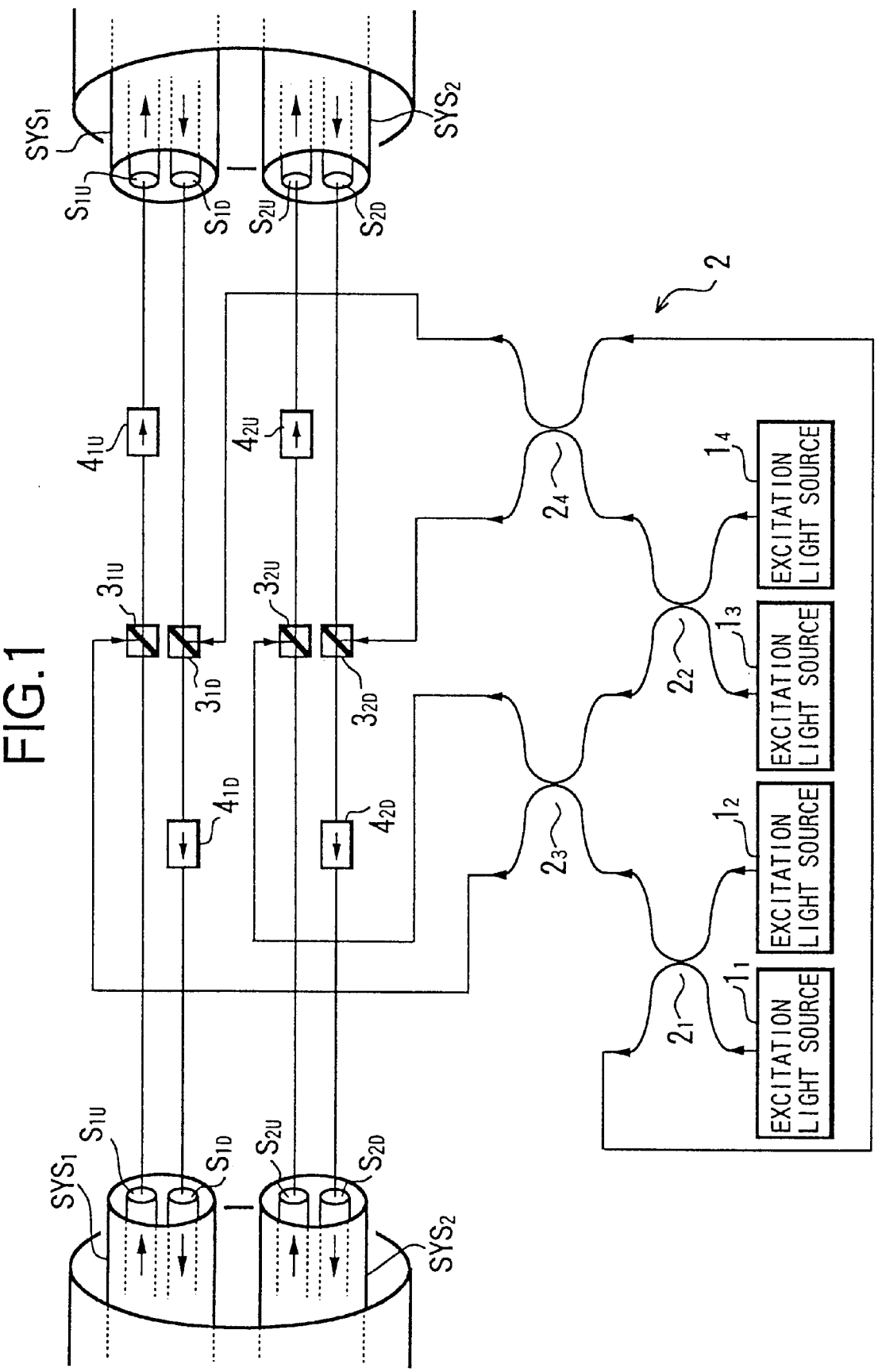
FIG. 1 shows the structure of an optical repeater using Raman amplification according to a first embodiment of the present invention.

FIG. 1 shows a structure of an optical repeater using Raman amplification according to the first embodiment.

In FIG. 1, the present optical repeater using Raman amplification has a basic structure in which, for example, excitation lights supplied from each of four excitation light sources $1_1$, $1_2$, $1_3$ and $1_4$, as a plurality of excitation light generation sections, are distributed to Raman amplification media contained in each of transmission systems of a fiber pair line $SYS_1$, formed by combining an ascending transmission system $S_{1U}$ with a descending transmission system $S_{1D}$, and of a fiber pair line $SYS_2$, formed by combining an ascending transmission system $S_{2U}$ with a descending transmission system $S_{2D}$, via a star coupler 2 of 4×4 ports as an optical multiplexing/demultiplexing section and optical multiplexers $3_{1U}$, $3_{2U}$, $3_{1D}$ and $3_{2D}$ as excitation light multiplexing sections.

The excitation light sources $1_1$ through $1_4$ generate excitation lights for Raman amplification having wavelengths $\lambda_{P1}$ through $\lambda_{P4}$ corresponding to the wavelength bands of WDM signal lights propagated through the transmission systems $S_{1U}$, $S_{1D}$, $S_{2U}$ and $S_{2D}$, respectively. The wavelengths $\lambda_{P1}$ through $\lambda_{P4}$ of the respective excitation lights are determined in advance such that, based on the fact that the wavelength where Raman amplification gain is at a maximum is located at a frequency lower by 13.2 THz than the wavelength of the excitation light, by combining excitation lights of different wavelengths with each other, almost flat Raman gain can be obtained over the signal light wavelength band.

The star coupler 2 is constructed by combining, for example, 4 optical couplers, each optical coupler being of 2×2 ports with a branching ratio (%) of 50:50. To be specific, output ports of the excitation light sources $1_1$ and $1_2$ are connected to each input port of an optical coupler $2_1$, and output ports of the excitation light sources $1_3$ and $1_4$ are connected to each input port of an optical coupler $2_2$. Furthermore, one output port of the optical coupler $2_1$ and one output port of the optical coupler $2_2$ are connected to each input port of an optical coupler $2_3$, and the other output port of the optical coupler $2_2$ is connected to one input port of an optical coupler $2_4$. Moreover, the other output port of the optical coupler $2^1$ is connected to the other input port of the optical coupler $2_4$. As a result, the power of each excitation light input to each input port of the optical couplers $2_1$, and $2_2$ is branched to ¼, to be output from each output port of the optical couplers $2_3$ and $2_4$ equally.

The optical multiplexers $3_{1U}$, $3_{2U}$, $3_{1D}$ and $3_{2D}$ are inserted into the optical fiber transmission paths of the transmission systems $S_{1U}$, $S_{1D}$, $S_{2U}$ and $S_{2D}$ respectively, and supply the excitation lights output from the respective output ports of the star coupler 2 to the Raman amplification media of the transmission systems $S_{1U}$, $S_{1D}$, $S_{2U}$ and $S_{2D}$ respectively. Here, the respective excitation lights are multiplexed in the opposite direction to the propagation direction of the WDM signal lights propagated through the transmission systems $S_{1U}$, $S_{1D}$, $S_{2U}$ and $S_{2D}$, and the optical fiber transmission paths connected to signal light input ports of the optical multiplexers $3_{1U}$, $3_{2U}$, $3_{1D}$ and $3_{2D}$ function as Raman amplification media. Furthermore, optical isolators $4_{1U}$, $4_{2U}$, $4_{1D}$ and $4_{2D}$ which pass lights being propagated in the same direction as the WDM signal lights and prevent lights being propagated in the opposite direction, are arranged on the signal light output sides of the optical multiplexers $3_{1U}$, $3_{2U}$, $3_{1D}$ and $3_{2D}$ respectively. Here, the optical isolators $4_{1U}$, $4_{2U}$, $4_{1D}$ and $4_{2D}$ can also be omitted, In the optical repeater using Raman amplification of the first embodiment having a basic structure as described above, the excitation lights output from the four excitation light sources $1_1$ through $1_4$ are supplied to the Raman amplification media of the transmission systems $S_{1U}$, $S_{1D}$, $S_{2U}$ and $S_{2D}$, respectively without loss and with balance. As a result, since each WDM signal light propagated trough the four transmission systems can be Raman amplified with high excitation efficiency, it becomes possible to realize a small sized optical repeater using Raman amplification with low power consumption.

Here, the basic structure of the abovementioned optical repeater using Raman amplification is such that the excitation lights from the four excitation light sources $1_1$ through $1_4$ are distributed to the Raman amplification media of the four transmission systems $S_{1U}$, $S_{1D}$, $S_{2U}$, and $S_{2D}$, respectively. However, the present invention is not limited to this. It is possible to generalize the structure such that m and n are positive numbers greater than or equal to two, and the excitation lights from m excitation light sources are distributed to the Raman amplification media of n transmission systems, respectively. In this case, the excitation lights are supplied to the Raman amplification media of the respective transmission systems via a star coupler of m×n ports and n optical multiplexers.

Figure 2:
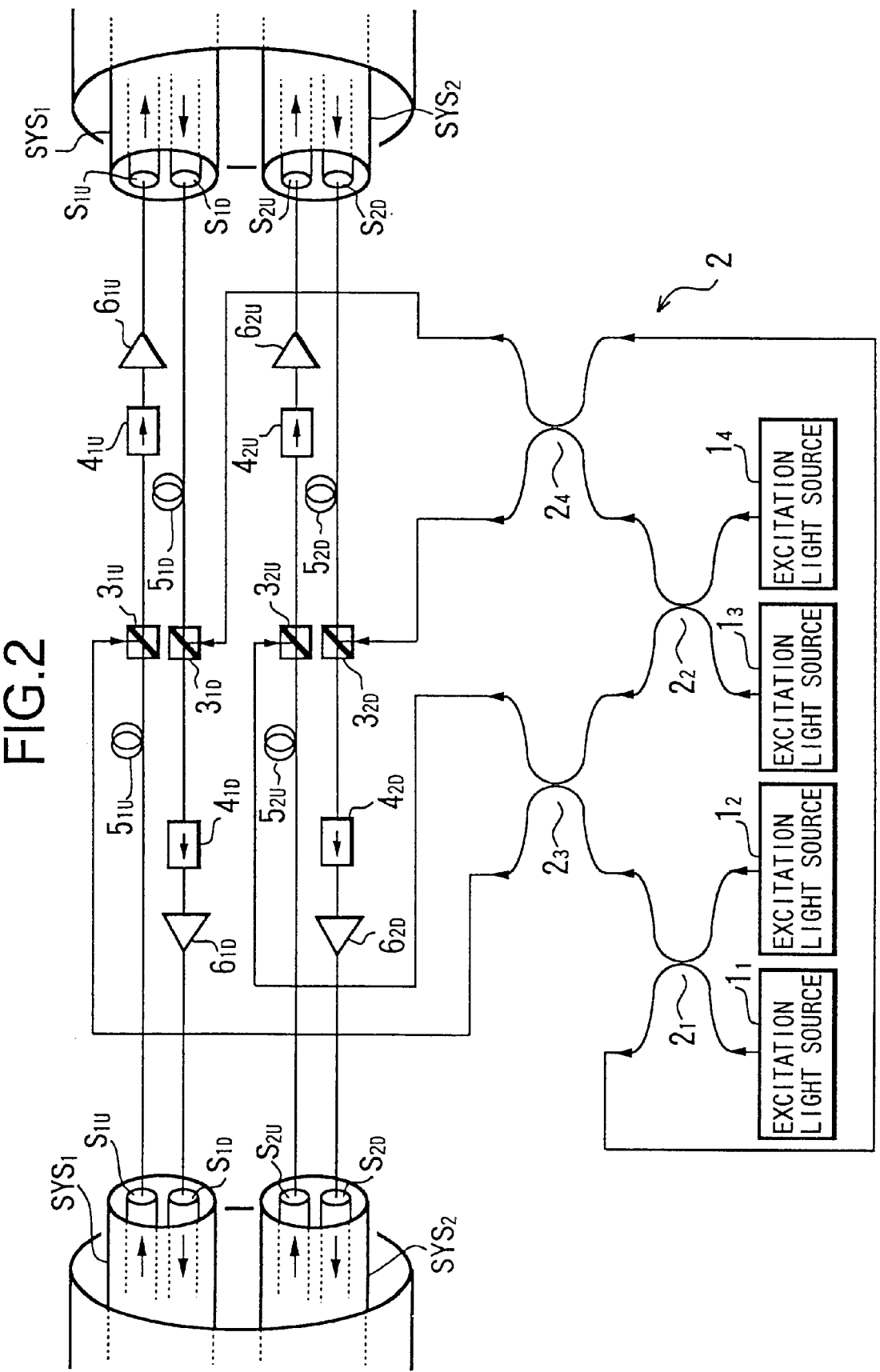
FIG. 2 shows a structural example of a case where an optical repeater using Raman amplification of lumped Raman amplification type is combined with a REDFA, with regard to the first embodiment.

Furthermore, in the abovementioned basic structure, the structure of so-called distributed Raman amplification is shown, in which the optical fiber transmission path of each of the transmission systems $S_{1U}$, $S_{1D}$, $S_{2U}$ and $S_{2D}$ is a Raman amplification medium. However, for example as shown in FIG. 2, the structure may be of so-called lumped Raman amplification in which separate Raman amplification media $5_{1U}$, $5_{2U}$, $5_{1D}$ and $5_{2D}$ are inserted between the signal light input ports of optical multiplexers $3_{1U}$, $3_{2U}$, $3_{1D}$ and $3_{2D}$ and the optical fiber transmission paths. Moreover, as shown in FIG. 2 for example, REDFA $6_{1U}$, $6_{2U}$, $6_{1D}$ and $6_{2D}$ are installed on the signal light output sides of the optical multiplexers $3_{1U}$, $3_{2U}$, $3_{1D}$ and $3_{2D}$, to combine REDFA with optical repeater using Raman amplification, thus enabling of an application achieving a wideband optical amplification repeater.

Next is a description of a second embodiment of an optical repeater using Raman amplification according to the present invention.

In the optical repeater using Raman amplification of the first embodiment described above, there is a possibility that errors in the branching ratio of the optical couplers $2_1$ through $2_4$ constituting the star coupler 2 cause dispersion in the powers of the excitation lights distributed to the Raman amplification media of the transmission systems $S_{1U}$, $S_{1D}$, $S_{2U}$ and $S_{2D}$. Such dispersion in excitation light powers is not a major problem in a WDM optical amplifying-and-repeating transmission system with a small number of repeaters and a short system length. However, in a system that covers several thousands of kilometers, such as across an ocean, in a case where one transmission system is considered, by causes such as the abovementioned dispersion in excitation light powers and the characteristic variation in the optical transmission paths, there is a possibility that repeater output power is increased or decreased accidentally and continuously. As a result, there is a possibility of an increase in reception level difference between wavelengths of the WDM signal light of immediately before the optical receiver after multi-stage repeating. Furthermore, since the WDM signal lights of a plurality of transmission systems are amplified by one optical repeater using Raman amplification, if a Raman amplification operation is not controlled such that, for each transmission system, important parameters such as total output light power of the repeater, optical power (or gain) of the signal light wavelength band corresponding to the excitation light wavelength, a deviation of the optical power (or gain) and the like are all within allowable ranges, there is a possibility that the WDM signal lights of all transmission systems cannot be transmitted with a required error rate or less. Therefore, in the second embodiment, with consideration of the problems as described above, an optical repeater using Raman amplification in which an improvement is provided to achieve stabilization of the Raman amplification operation will be described.

Figure 3:
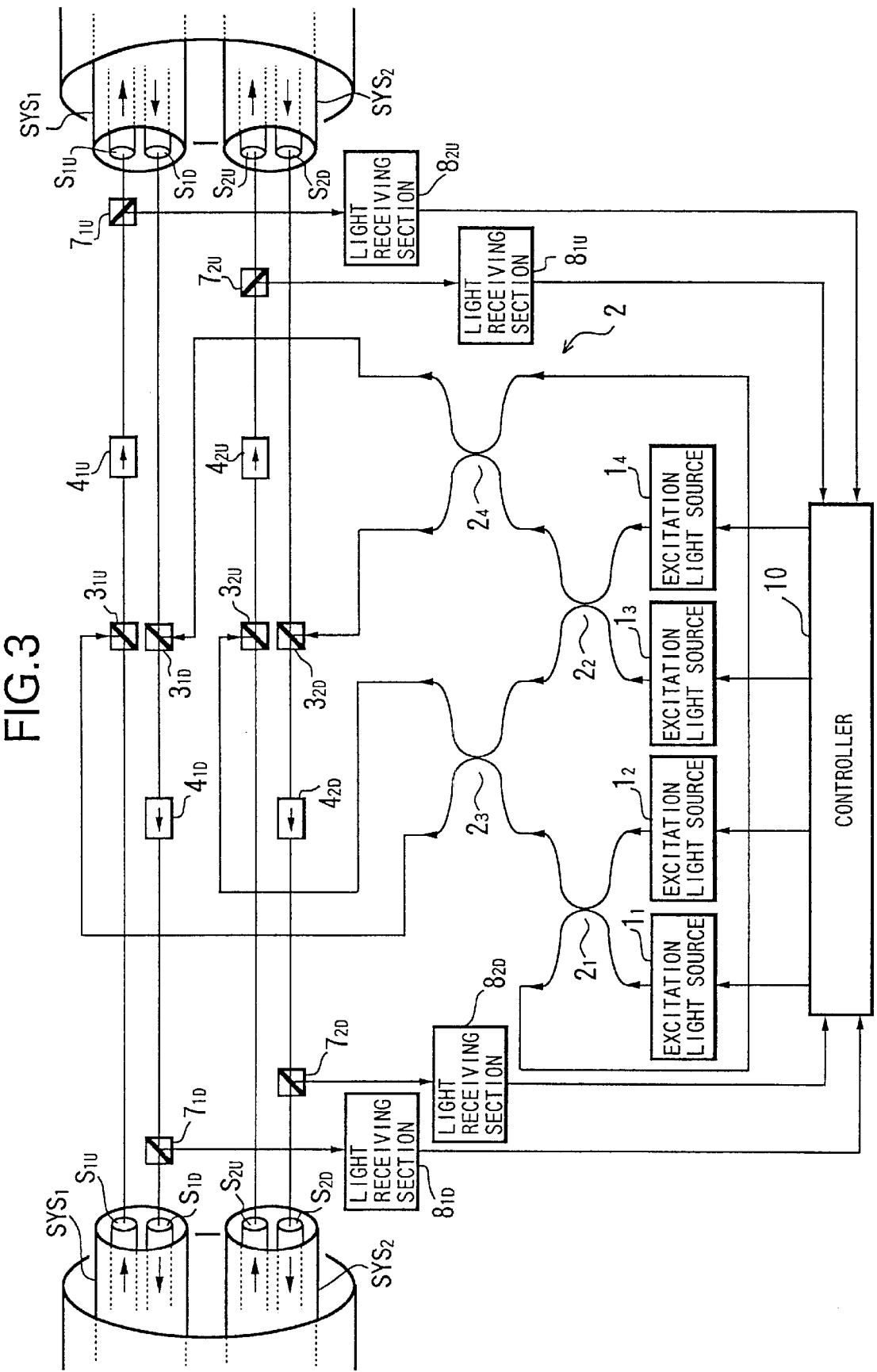
FIG. 3 shows the structure or an optical repeater using Raman amplification according to a second embodiment of the present invention.

FIG. 3 shows the structure of an optical repeater using Raman amplification according to the second embodiment. The same symbols are used here as for the corresponding parts in the structure of the first embodiment, and this is the same in the other embodiments following.

In FIG. 3, the present optical repeater using Raman amplification, for example, for the basic structure of the abovementioned first embodiment shown in the FIG. 1, is provided with light branching devices $7_{1U}$, $7_{1D}$, $7_{2U}$ and $7_{2D}$ and light receiving sections $8_{1U}$, $8_{1D}$, $8_{2U}$ and $8_{2D}$, as signal light power detecting sections for monitoring repeater output powers of WDM signal lights propagated through transmission systems $S_{1U}$, $S_{1D}$, $S_{2U}$ and $S_{2D}$, and a controller 10 as a control section for adjusting the powers of the excitation lights output from the excitation light sources $1_1$ through $1_4$ based on the monitored results of the light receiving sections $8_{1U}$, $8_{1D}$, $8_{2U}$ and $8_{2D}$.

The light branching devices $7_{1U}$, $7_{1D}$, $7_{2U}$ and $7_{2D}$ each branches, for example, a part of the WDM signal light that passes through each of the optical isolators $4_{1U}$, $4_{2U}$, $4_{1D}$ and $4_{2D}$ to be sent to each of the transmission systems $S_{1U}$, $S_{1D}$, $S_{2U}$ and $S_{2D}$, and outputs the branched light to the corresponding one of light receiving sections $8_{1U}$, $8_{1D}$, $8_{2U}$ and $8_{2D}$. Here, the construction is such that the light branching devices $7_{1U}$, $7_{1D}$, $7_{2U}$ and $7_{2D}$ are arranged on the output port sides of the optical isolators $4_{1U}$, $4_{2U}$, $4_{1D}$ and $4_{2D}$, respectively. However, the light branching devices $7_{1U}$, $7_{1D}$, $7_{2U}$ and $7_{2D}$ may be arranged between the signal light output ports of the optical multiplexers $3_{1U}$, $3_{2U}$, $3_{1D}$ and $3_{2D}$ and the input ports of the optical isolators $4_{1U}$, $4_{2U}$, $4_{1D}$ and $4_{2D}$.

Figure 4:
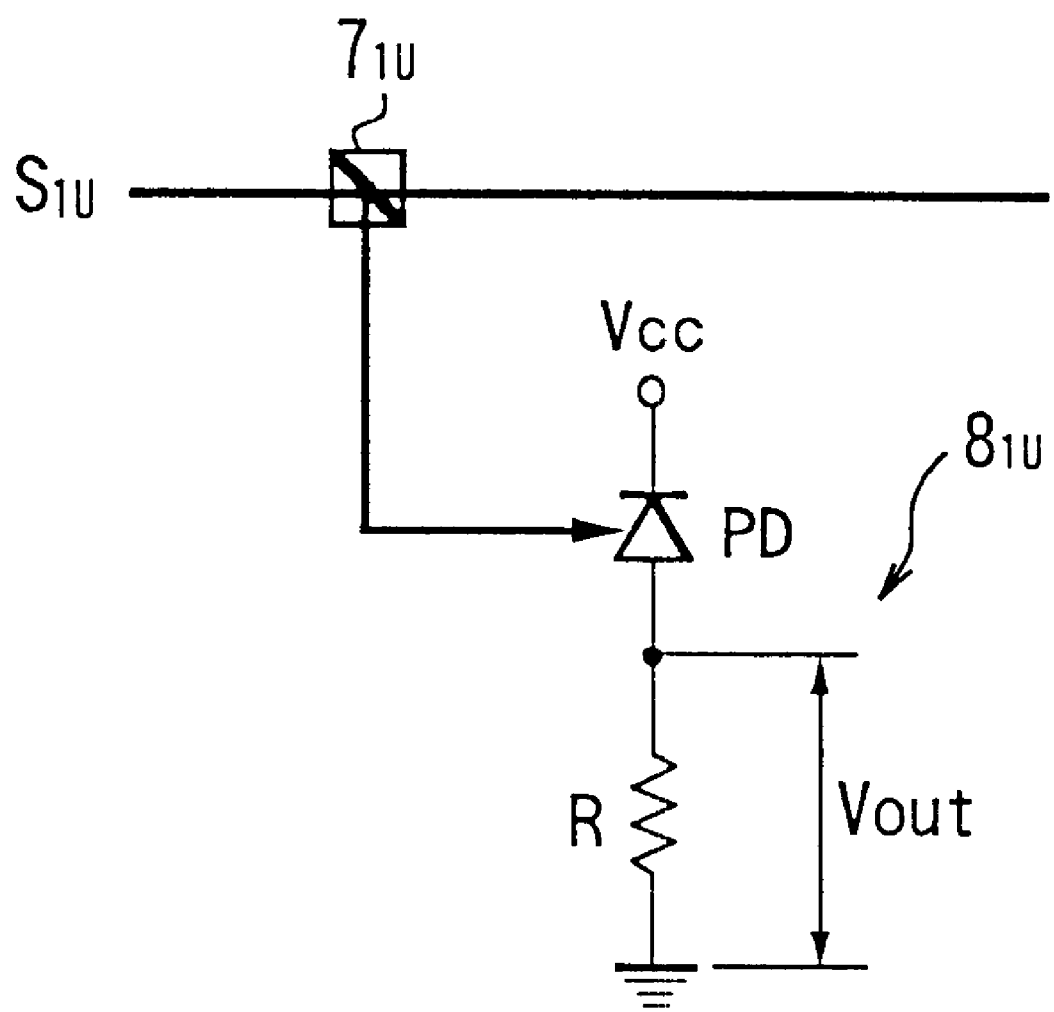
FIG. 4 shows a specific structural example of a light receiving section used in the second embodiment.

The light receiving sections $8_{1U}$, $8_{1D}$, $8_{2U}$ and $8_{2D}$ here detect the total optical powers over the whole wavelength band of the WDM signal lights branched by the light branching devices $7_{1U}$, $7_{1D}$, $7_{2U}$ and $7_{2D}$, respectively, and output signals indicating the detection results to the controller 10. For a specific structure of the light receiving section $8_{1U}$, for example as shown in FIG. 4, a circuit configuration may be used in which branched light from the light branching device $7_{1U}$ is received by a light receiving element PD and converted to a current signal, and a voltage $V_{OUT}$ between terminals of a resistor R connected between the light receiving element PD and an earth terminal is output to the controller 10 as a signal indicating the total optical power. Here, the sane specific structure of the abovementioned light receiving section $8_{1U}$ is possible for the other light receiving sections $8_{1D}$, $8_{2U}$ and $8_{2D}$.

The controller 10 computes a mean value of the total optical powers of the WDM signal lights monitored by the light receiving sections $8_{1U}$, $8_{1D}$, $8_{2U}$ and $8_{2D}$, and adjusts the excitation light powers output from the excitation light sources $1_1$ through $1_4$ such that the mean value approaches a target value set in advance.

Figure 5:
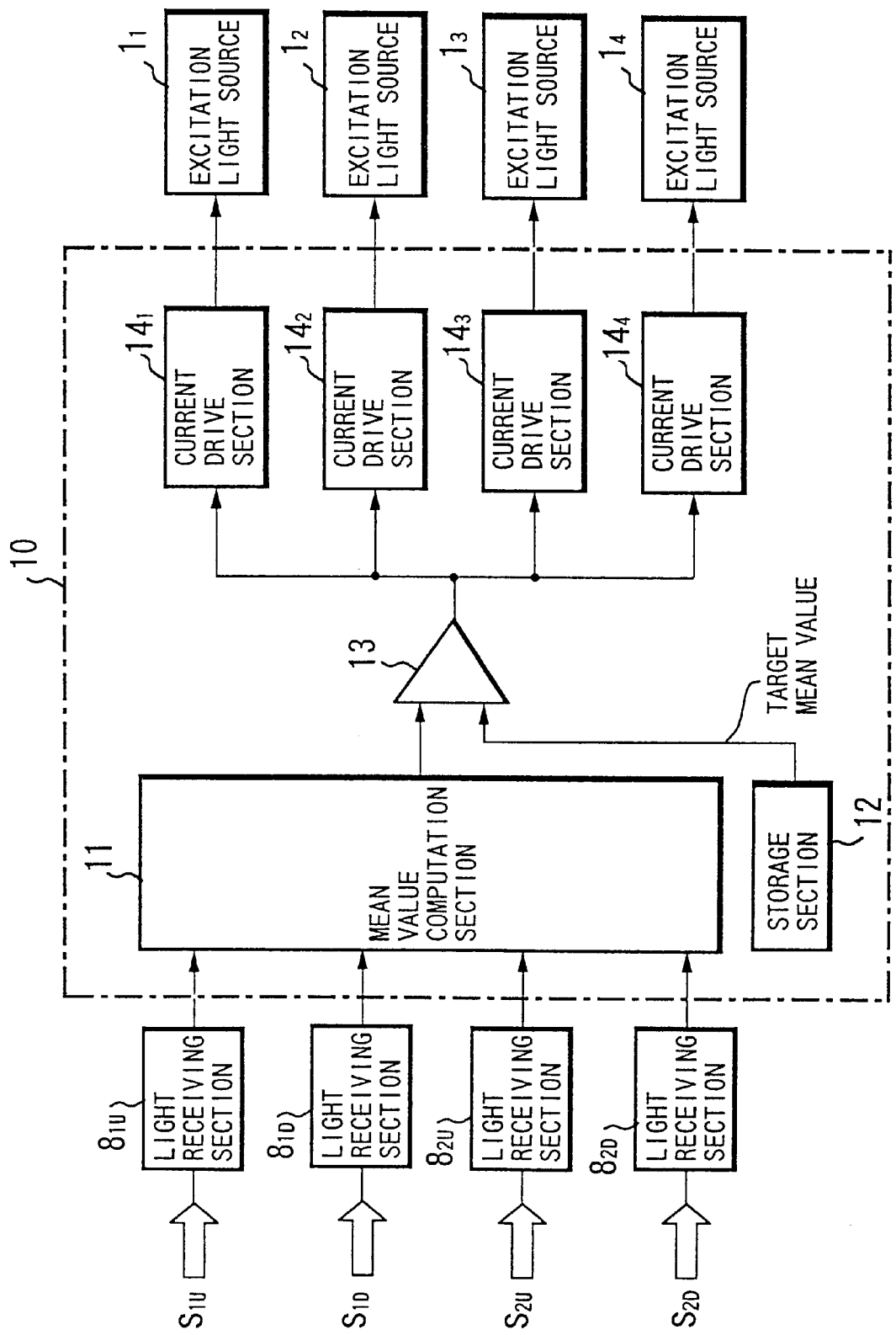
FIG. 5 shows a specific structural example of a controller used in the second embodiment.

Here is a detailed description of a specific, structural example of the controller 10 using a block diagram in FIG 5.

In the structural example of FIG. 5, the controller 10 has a mean value computation section 11, a storage section 12, a comparison section 13 and current drive sections $14_1$, $14_2$, $14_3$ and $14_4$. The mean value computation section 11 into which are input the output signals from the light receiving sections $8_{1U}$, $8_{1D}$, $8_{2U}$ and $8_{2D}$, computes a mean value of the total optical powers monitored by the light receiving sections $8_{1U}$, $8_{1D}$, $8_{2U}$ and $8_{2D}$, and transmits the computed result to the comparison section 13. The storage section 12 stores a target value of the mean value (referred to hereunder as a target mean value) of the total optical powers computed by the mean value computation section 11. The comparison section 13 compares the mean value of the total optical powers output from the mean value computation section 11 with the target mean value stored in the storage section 12, and outputs a signal indicating a difference between the mean value and the target mean value to each of the current drive sections $14_1$, through $14_4$. The current drive sections $14_1$, through $14_4$ are typical drive circuits for supplying drive currents to excitation light sources $1_1$ through $1_4$, respectively, to generate excitation lights, and a value of each drive current is controlled according to the difference signal output from the comparison section 13.

In the Raman optical amplifier repeater with a construction as described above, similarly to the case of the abovementioned first embodiment, the excitation lights output from the four excitation light sources $1_1$ through $1_4$ are supplied to the Raman amplification media of the transmission systems $S_{1U}$, $S_{1D}$, $S_{2U}$ and $S_{2D}$, respectively, via the star coupler 2 and optical multiplexers $3_{1U}$, $3_{2U}$, $3_{1D}$ and $3_{2D}$, and also the total optical powers of WDM signal lights after Raman amplification corresponding to the transmission systems $S_{1U}$, $S_{1D}$, $S_{2U}$ and $S_{2D}$ are monitored by the light receiving sections $8_{1U}$, $8_{1D}$, $8_{2U}$ and $8_{2D}$, respectively, and respective monitored results are transmitted to the controller 10. In the controller 10, the mean value of the total optical powers of the transmission systems $S_{1U}$, $S_{1D}$, $S_{2U}$ and $S_{2D}$ is computed, and in the comparison section 13, the difference of the mean value from the target mean value stored in the storage section 12 is obtained. Then, the drive current values supplied from the current drive sections $14_1$ through $14_4$ to the corresponding excitation light sources $1_1$ through $1_4$ are increased or decreased by the same amount depending on the difference value obtained by the comparison section 13. As a result, the excitation light powers of the wavelengths $\lambda_{P1}$ through $\lambda_{P4}$ generated by the excitation light sources $1_1$ through $1_4$ are feedback controlled such that the mean value of the total optical powers of the transmission systems $S_{1U}$, $S_{1D}$, $S_{2U}$ and $S_{2D}$ approaches the target mean value.

In this manner, according to the second embodiment, the total optical powers of the WDM signal lights after Raman amplification corresponding to the transmission systems $S_{1U}$, $S_{1D}$, $S_{2U}$ and $S_{2D}$ are monitored to obtain the mean value, and the powers of the excitation lights sent from the excitation light sources $1_1$ through $1_4$ to the star coupler 2 are automatically controlled. Consequently, it is possible to reduce an influence on Raman amplification operation caused by the dispersion of the excitation light powers due to errors in the branching ratio of the star coupler 2 and the characteristic variation of optical transmission paths and the like. This enables Raman amplification of WDM signal lights propagated through the four transmission systems $S_{1U}$, $S_{1D}$, $S_{2U}$ and $S_{2D}$, with high excitation efficiency and stability.

Figure 6:
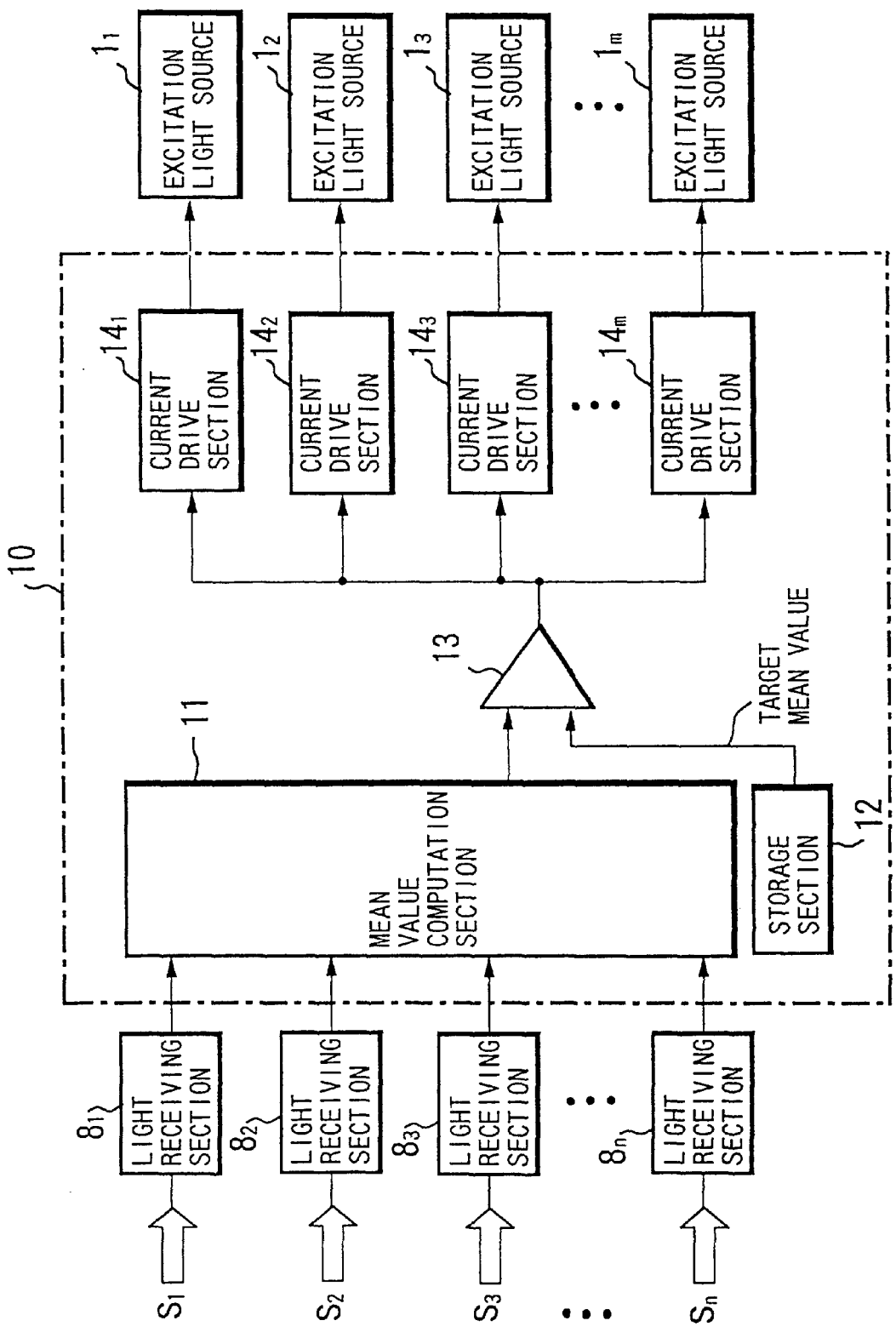
FIG. 6 a shows a specific structural example of a controller in a case of a generalized structure of m excitation light sources and n transmission systems, with regard to the second embodiment.

Here, the construction shown in the above second embodiment is also such that the excitation lights from the four excitation light sources $1_1$ through $1_4$ are distributed to the Raman amplification media of the four transmission systems $S_{1U}$, $S_{1D}$, $S_{2U}$ and $S_{2D}$. However, similarly to the case described in the abovementioned first embodiment, the construction may also be generalized such that the excitation lights from m excitation light sources are distributed to the Raman amplification media of n transmission systems. A specific structural example of the controller 10 in this generalized is shown in FIG. 6. In the structural example of FIG. 6, the total optical power values monitored by the light receiving sections $8_1$, through $8_n$ are sent to the mean value computation section 11, and according to the difference between the mean value computed by the mean value computation section 11 and the target mean value, the drive current values of current drive sections $14_1$ through $14_n$ corresponding to m excitation light sources are controlled.

Figure 7:
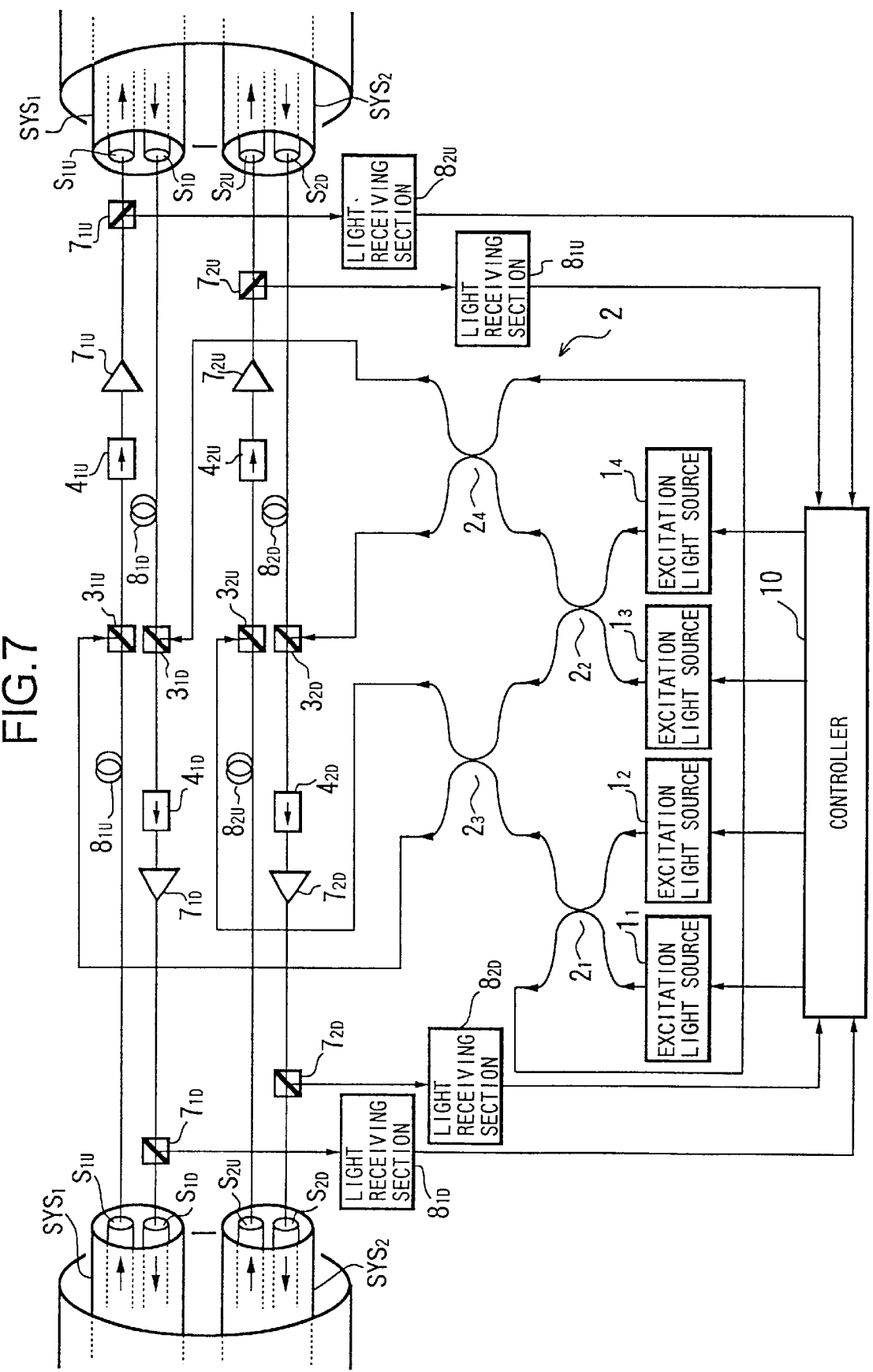
FIG. 7 shows a structural example of a case where an optical repeater using Raman amplification of lumped Raman amplification type is combined with a REDFA, with regard to the second embodiment.

Furthermore, a structure of distributed Raman amplification is shown for the second embodiment. However, the present optical repeater using Raman amplification is also applicable to a structure of lumped Raman amplification or a structure using a combination of lumped Raman amplification with REDFA. A structural example of a case where lumped Raman amplification is combined with REDFA is shown in FIG. 7. In the structural example of FIG. 7, the light branching devices $7_{1U}$, $7_{1D}$, $7_{2U}$ and $7_{2D}$ are arranged on the post stages of output ports of the REDFA $6_{1U}$, $6_{2U}$, $6_{1D}$ and $6_{2D}$ respectively, and the total optical powers after Raman amplification and further amplified by the REDFA are monitored by the light receiving sections $8_{1U}$, $8_{1D}$, $8_{2U}$ and $8_{2D}$ corresponding to the transmission systems, respectively. Here, even in a case where the REDFA are used in combination, the controller 10 basically adjusts the excitation light powers output from the excitation light sources $1_1$ through $1_n$, to control the Raman amplification operation such that the mean value of the total optical powers of the transmission systems approaches the target mean value.

Next is a description of a third embodiment of an optical repeater using Raman amplification according to the present invention.

In the aforementioned second embodiment, a case is described in which, according to the difference between the mean value of the total optical powers monitored for the respective transmission systems and the target mean value, the drive current values of the current drive sections $14_1$ through $14_4$ are increased or decreased by the same amount to control the powers of the excitation lights. However, since a change in Raman gain to a change in excitation light power is sometimes different for each wavelength of excitation light depending on loss wavelength characteristics of optical path, a situation can also be considered in which, preferably, the excitation light powers of respective wavelength are not controlled uniformly by the same amount as in the second embodiment, but the excitation light power is controlled for each wavelength individually. Therefore, in the third embodiment, an optical repeater using Raman amplification will be described wherein excitation light power is controlled for each wavelength to achieve high accuracy.

Figure 8:
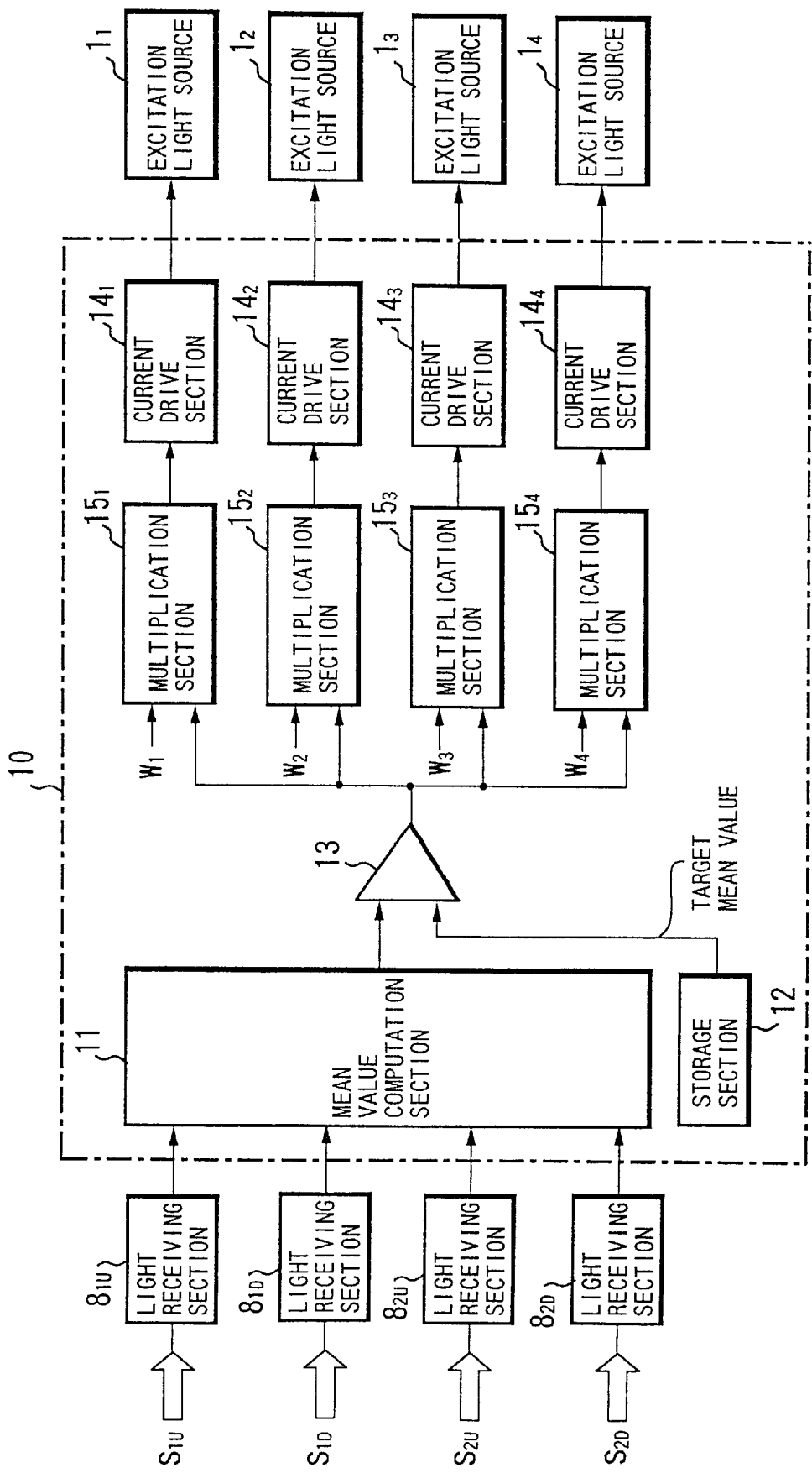
FIG. 8 shows a specific structural example of a controller used in an optical repeater using Raman amplification according to a third embodiment of the present invention.

FIG. 8 shows a specific structural example of a controller used for an optical repeater using Raman amplification according to the third embodiment. Here, the overall structure of the optical repeater using Raman amplification is the same as in the case of the second embodiment shown in FIG. 3, and hence the description is omitted.

In FIG. 8, the controller 10 used in the present embodiment is provided with multiplication sections $15_1$ through $15_4$ (correction section) for multiplying difference values output from the comparison section 13 by weighting coefficients $W_1$ through $W_4$, set in advance corresponding to the excitation light sources $1_1$ through $1_4$ of respective wavelengths, to output the results to the current drive sections $14_1$ through $14_4$, for the structure in the case of the abovementioned second embodiment shown in FIG. 5.

The weighting coefficients $W_1$ through $W_4$ are set in advance based on the values of excitation light powers necessary to achieve the required Raman gain for the excitation light sources $1_1$ through $1_4$ of respective wavelength. To be specific, for example, if the excitation light powers required to achieve 10 dB of Raman gain are 100 mW for wavelength $\lambda_{P1}$, and 80 mW for wavelength $\lambda_{P2}$, a ratio of the weighting coefficient $W_1$ corresponding to the wavelength $\lambda_{P1}$ and the weighting coefficient $W_2$ corresponding to the wavelength $\lambda_{P2}$ is $W_1:W_2=5:4$, Therefore, if the weighting coefficient is $W_2=1$ with the wavelength $\lambda_{P2}$, as a reference, the weighting coefficient $W_1=1.25$ can be set. The weighting coefficients $W_1$ through $W_4$ set corresponding to the wavelengths $\lambda_{P1}$ through $\lambda_{P4}$ of the excitation lights as described above are applied to the corresponding multiplication sections $15_1$ through $15_4$, respectively.

The multiplication sections $15_1$ through $15_4$ perform weighting (correction) of the control values corresponding to the wavelengths $\lambda_{P1}$ through $\lambda_4$ of the excitation light sources $1_1$ through $1_4$ by multiplying the difference value sent from the comparison section 13 by the weighting coefficients $W_1$ through $W_4$, respectively, to output weighted control values to the corresponding current drive sections $14_1$ through $14_4$.

In the optical repeater using Raman amplification using the controller 10 with a construction as described above, the difference value between the mean value of the total optical powers monitored corresponding to the transmission systems $S_{1U}$, $S_{1D}$, $S_{2U}$ and $S_{2D}$, and the target mean value is multiplied by the weighting coefficients $W_1$ through $W_4$ in the multiplication sections $15_1$ through $15_4$, respectively, to generate control values corresponding to the wavelengths $\lambda_{P1}$ through $\lambda_{P4}$ of the excitation lights. Then, according to the control values, the drive current values to be supplied from the current drive sections $14_1$ through $14_4$ to the excitation light sources $1_1$ through $1_4$, respectively, are individually increased or decreased, and the excitation light powers of the wavelengths $\lambda_{P1}$ through $\lambda_{P4}$ generated by the excitation light sources $1_1$ through $1_4$ are feedback controlled such that the mean value of the total optical powers of the transmission systems $S_{1U}$, $S_{1D}$, $S_{2U}$ and $S_{2D}$ approaches the target mean value.

In this manner, according to the third embodiment, weighting coefficients $W_1$ through $W_4$ corresponding to the wavelengths $\lambda_{P1}$ through $\lambda_{P4}$ of the excitation lights are set, and the drive currents of the excitation light sources $1_1$ through $1_4$ are individually increased or decreased. Consequently, compared with the case of the second embodiment, it becomes possible to control the Raman amplification operation of the transmission systems $S_{1U}$, $S_{1D}$, $S_{2U}$ and $S_{2D}$ with higher accuracy.

Next is a description of a fourth embodiment of an optical repeater using Raman amplification according to the present invention.

In the fourth embodiment, for the basic structure shown in the abovementioned first embodiment, an optical repeater using Raman amplification in which another improvement is made to achieve stability of Raman amplification operation will be described.

Figure 9:
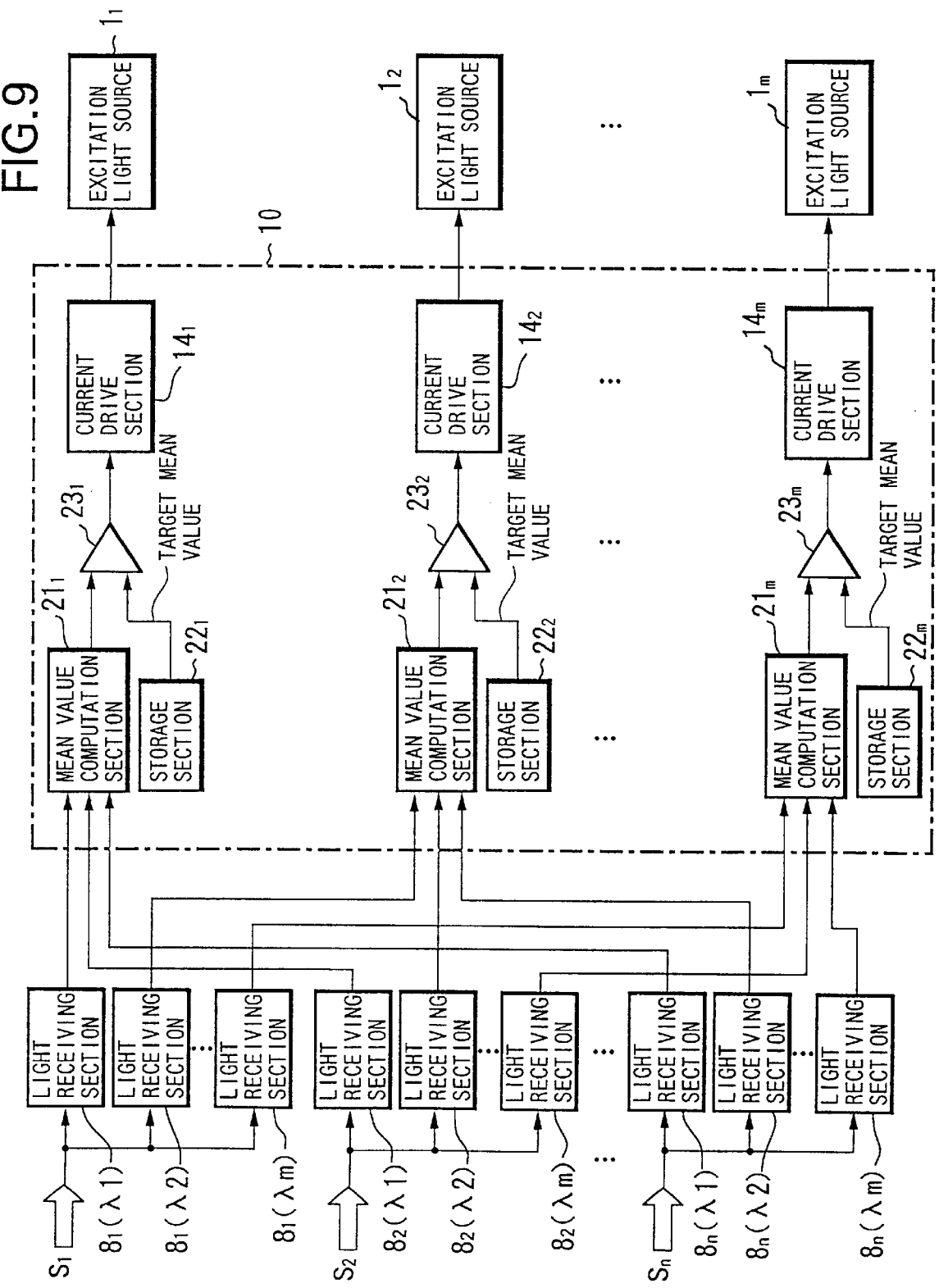
FIG. 9 shows a structure of the main parts of an optical repeater using Raman amplification according to a fourth embodiment of the present invention.

FIG. 9 is a block diagram showing a structure of the main part of an optical repeater using Raman amplification according to the fourth embodiment. Here, the overall structure of the optical repeater using Raman amplification is basically the same as that of the second embodiment shown in FIG. 3 described above. However, in the present embodiment, a case is considered where the basic structure of the optical repeater using Raman amplification is generalized to m excitation light sources $1_1$ through $1_m$ and n transmission systems $S_1$ through $S_n$.

In FIG. 9, in the optical repeater using Raman amplification of the present embodiment, for each of n transmission systems $S_1$ through $S_n$, the power of a monitor light obtained by branching a part of WDM signal light after Raman amplification is divided into Raman gain wavelength bands corresponding to the excitation light wavelengths of m excitation light sources $1_1$ through $1_m$ for monitoring. For division of the gain wavelength bands to monitor the optical power, the wavelength bands λ1 through λm of the signal lights to be controlled by the excitation light sources $1_1$ through $1_m$, that is to say, the main wavelength bands λ1 through λm of signal lights to be Raman amplified by excitation lights of wavelengths $\lambda_{P1}$ through $\lambda_{Pm}$, are set in advance. To be specific, it is possible to set gain wavelength bands such that the central wavelength of each of the wavelength bands λ1 through λm almost matches a wavelength corresponding to a frequency lower by 13.2 THz than the wavelengths $\lambda_{P1}$ through $\lambda_{Pm}$ of the corresponding excitation lights. Here, for the transmission system $S_1$, the light receiving sections $8_1(\lambda 1)$, $8_1(\lambda 2)$, $\cdots$, $8_1(\lambda m)$ are provided as a structure for monitoring the optical powers corresponding to the wavelength bands $\lambda 1$ through $\lambda m$ of WDM signal light. Similarly, for each of the transmission Systems $S_2$ through $S_n$, light receiving sections $8_2(\lambda 1)$, $8_2(\lambda 2)$, $\cdots$, $8_2(\lambda m)$ through $8_n(\lambda 1)$, $8_n(\lambda 2)$, $\cdots$, $8_n(\lambda m)$ are installed.

Figure 10:
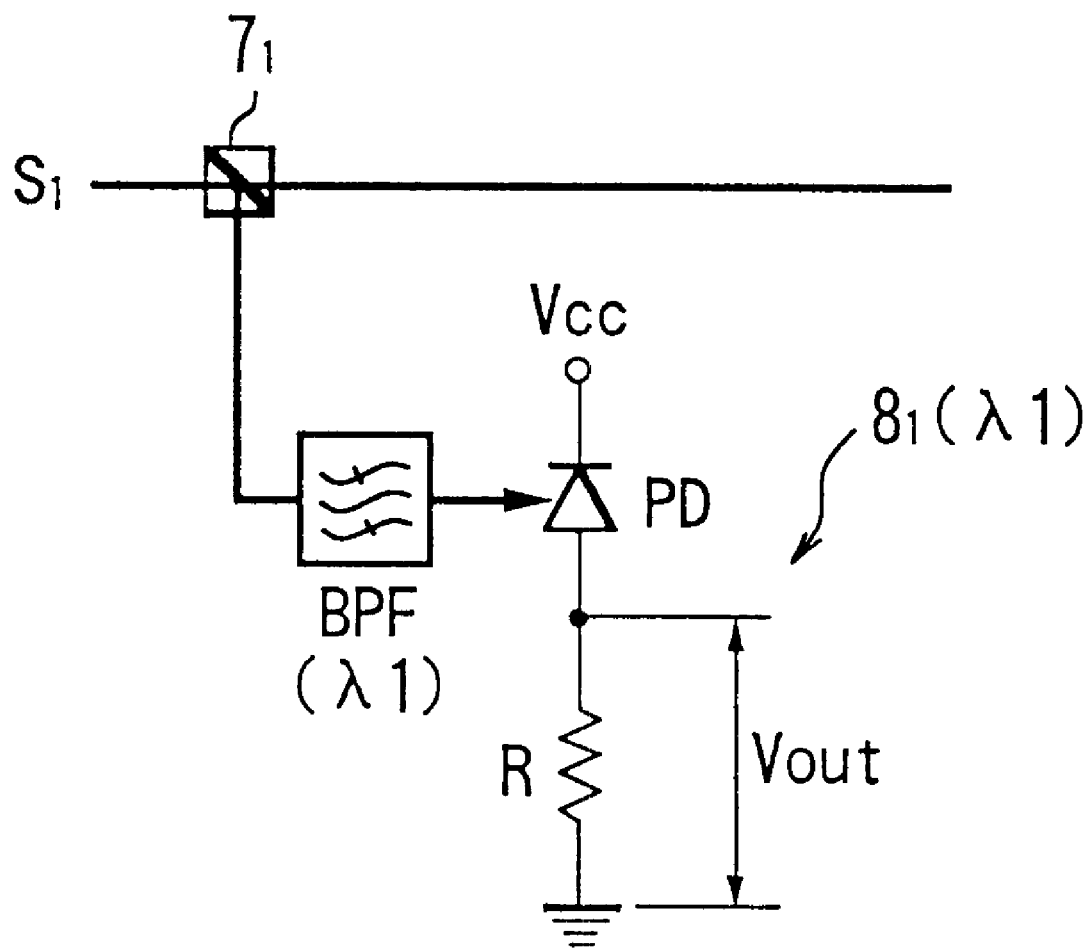
FIG. 10 shows a specific structural example of a light receiving section used in the fourth embodiment.

A specific structure of the light receiving section $8_1(\lambda 1)$, for example as shown in FIG. 10, may be a circuit configuration or similar wherein by passing a WDM signal light from the transmission system $S_1$ branched by a light branching device $7_1$ through a band-pass optical filter BPF, to extract the wavelength band $\lambda 1$ component, the extracted light is received by a light receiving element PD and converted into a current signal, and a voltage $V_{OUT}$ between the terminals of a resistor R connected between the light receiving element and an earth terminal is output to the controller 10 as a signal indicating the optical power of the wavelength band $\lambda 1$. Here, for the light receiving sections other than the light receiving section $8_1(\lambda 1)$, the same specific structure is possible as for the light receiving section $8_1(\lambda 1)$ described above by changing the pass band of the band-pass optical filter BPF corresponding to the wavelength band to be monitored. Furthermore, the band-pass optical filter BPF is used here as a device to extract the wavelength bands $\lambda 1$ through $\lambda m$ components. However alternatively, for example, an optical device such as arrayed waveguide gratings (AWG) or the like may be used. Alternatively, it is also possible to measure the optical powers of the wavelength bands $\lambda 1$ through $\lambda m$ by using an optical spectrum analyzer or the like.

The monitored results of the light receiving sections $8_1(\lambda 1)$ through $8_n(\lambda m)$ are sent to the controller 10, the mean values are processed for each of the wavelength bands $\lambda 1$ through $\lambda m$, and the drive conditions of the excitation light sources $1_1$ through $1_m$ are controlled. The construction of the controller 10 used for the present embodiment may be, for example as shown in FIG. 9, such that mean value computation sections $21_1$ through $21_m$, storage sections $22_1$ through $22_m$, comparison sections $23_1$ through $23_m$, and current drive sections $14_1$ through $14_m$ are provided corresponding to the excitation light sources $1_1$ through $1_m$, respectively. The monitored values of optical powers obtained in the light receiving sections $8_1(\lambda 1)$ through $8_n(\lambda 1)$ corresponding to the wavelength band $\lambda 1$ of the transmission systems $S_1$ through $S_n$ are sent to the mean value computation section $21_1$. Similarly, the monitored values of optical powers obtained in the light receiving sections $8_1(\lambda 2)$ through $8_n(\lambda 2)$, $\cdots$, $8_1(\lambda m)$ through $8_n(\lambda m)$ corresponding to the wavelength bands $\lambda 2$, $\cdots$, $\lambda m$ of the transmission systems $S_2$ through $S_n$ are sent to the mean value computation sections $21_2$, $\cdots$, $21_m$, respectively.

In the mean value computation sections $21_1$ through $21_m$, the mean values of optical powers sent from the corresponding light receiving sections are computed, and the computed results are transmitted to the comparison sections $23_1$ through $23_m$. In the comparison sections $23_1$ through $23_m$, the mean values of optical powers output from the mean value computation sections $21_1$ through $21_m$ and the target mean values stored in the storage sections $22_1$ through $22_m$ are compared, and signals indicating differences are output to the current drive sections $14_1$ through $14_m$. Here, the storage sections $22_1$ through $22_m$ store the target values of the mean values (target mean values) of optical powers computed by the mean value computation sections $21_1$ through $21_m$ corresponding to the relevant wavelength bands.

Then, in the current drive sections $14_1$ through $14_m$, similarly to the case in the second embodiment, according to the difference signals output from the comparison sections $23_1$ through $23_m$, values of drive current to be applied to the excitation light sources $1_1$ through $1_m$ are increased or decreased. As a result, the excitation light powers of the wavelengths $\lambda_{P1}$ through $\lambda_{Pm}$ generated in the excitation light sources $1_1$ through $1_m$ are controlled such that the mean value of optical powers corresponding to the wavelength bands $\lambda 1$ through $\lambda m$ approach the target mean values.

In this manner, according to the fourth embodiment, the power of WDM signal light after Raman amplification corresponding to each of the transmission systems $S_1$ through $S_n$ are monitored for each of the wavelength bands $\lambda 1$ through $\lambda m$ controlled by the excitation light sources $1_1$ through $1_m$, to obtain the mean values, and the drive conditions of the excitation light sources $1_1$ through $1_m$ are automatically controlled such that the mean value of each of the wavelength bands $\lambda 1$ through $\lambda m$ approaches the target value. Therefore, an influence on Raman amplification operation caused by the dispersion of excitation light power due to errors in the branching ratio of the star coupler 2, and the characteristic variation of optical transmission paths as mentioned earlier are effectively reduced for each of the wavelength bands $\lambda 1$ through $\lambda m$, and hence it becomes possible to control the Raman amplification operation with high accuracy. As a result, it is possible to Raman amplify the WDM signal lights propagated through n transmission systems $S_1$ through $S_n$ with high excitation efficiency and stability.

Next is a description of a fifth embodiment of an optical repeater using Raman amplification according to the present invention.

In the fifth embodiment, a modified example of the controller 10 used in the optical repeater using Raman amplification of the fourth embodiment mentioned before will be described.

Figure 11:
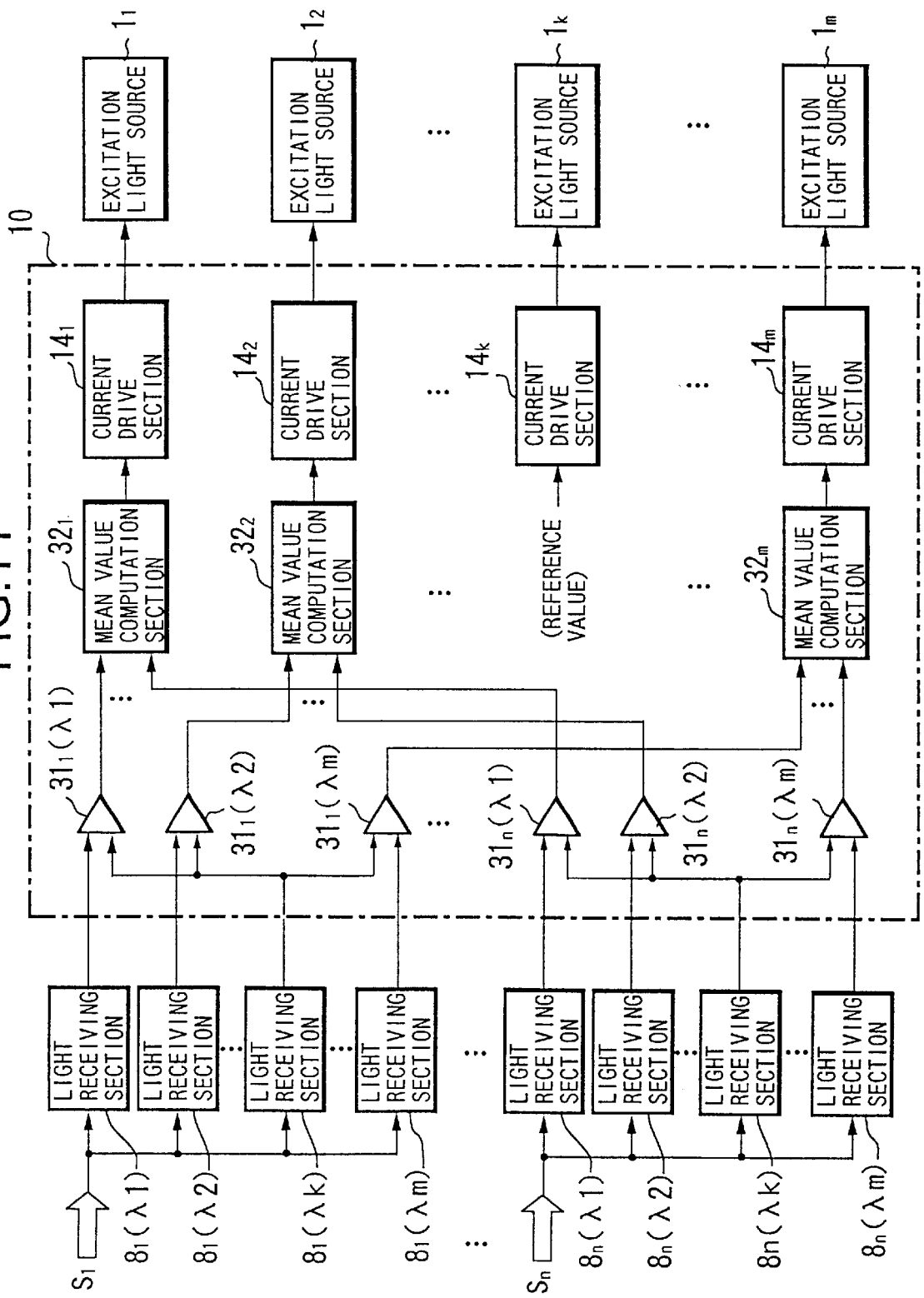
FIG. 11 shows a specific structural example of a controller used in an optical repeater using Raman amplification according to a fifth embodiment at the present invention.

FIG. 11 is a block diagram showing a structural example of a controller used in the optical repeater using Raman amplification of the fifth embodiment.

In FIG. 11, in the controller 10 used in the optical repeater using Raman amplification of the present embodiment, for example, one out of m excitation light sources $1_1$ through $1_m$ is selected appropriately and set as a reference excitation light source $1_k$, and for each of n transmission systems $S_1$, $\cdots$, $S_n$, the signal lights monitored in light receiving sections $8_1(\lambda k)$, $\cdots$, $8_n(\lambda k)$ corresponding to a wavelength band $\lambda k$ of the signal light controlled by the reference excitation light source $1_k$, and the optical powers monitored in the other light receiving sections are compared in comparison sections $31_1(\lambda 1)$ through $31_1(\lambda m)$, $\cdots$ $31_n(\lambda 1)$ through $31_n(\lambda m)$, and differences between the optical power of the reference wavelength band $\lambda k$ and the optical powers of the other wavelength bands are obtained.

Then, output signals of the comparison sections $31_1(\lambda 1)$, $\cdots$, $31_n(\lambda 1)$ corresponding to the wavelength band $\lambda 1$ of the transmission systems $S_1$, $\cdots$, $S_n$ are sent to a mean value computation section $32_1$, and a mean value of the differences is computed. Similarly, mean values of the differences respectively corresponding to the wavelength bands $\lambda 2$ through $\lambda m$ are computed in mean value computation sections $32_2$ through $32_m$. The mean values of the differences computed in the mean value computation sections $32_1$ through $32_m$ are input to corresponding current drive sections $14_1$ through $14_m$ respectively, and values of drive current to be applied to the excitation light sources $1_1$ through 1m are increased or decreased according to the mean values of the differences input. Here, the arrangement is, for example, such that a reference value set in advance is applied to the current drive section $14_k$ corresponding to the reference excitation light source $1_k$, so that a constant drive current is supplied to the excitation light source $1_k$. As a result, the excitation light powers of the wavelengths $\lambda_{P1}$ through $\lambda_{Pm}$ generated by the excitation light sources $1_1$ through $1_m$ are feedback controlled such that the optical powers of the other wavelength bands approach the optical power of the reference wavelength band λk.

In this manner, according to the fifth embodiment, the power of the WDM signal light after Raman amplification corresponding to each of the transmission systems $S_1$ through $S_n$ are monitored for each of the wavelength bands λ1 through λm controlled by the excitation light sources $1_1$ through $1_m$, the differences of the optical powers of the other wavelength bands from the optical power of the reference wavelength band λk are obtained, the mean values of the differences are computed corresponding to the respective wavelength bands, and the drive conditions of the excitation light sources $1_1$ through $1_m$ are automatically controlled. As a result, an influence on Raman amplification operation caused by the dispersion of excitation light powers due to errors in the branching ratio of the star coupler 2 as mentioned above, and the characteristic variation of optical transmission paths are reduced for each of the wavelength bands λ1 through λm effectively, and hence it becomes possible to control Raman amplification operation with high accuracy. In particular, the differences of the optical powers of the other wavelength bands from the optical power of the reference wavelength band λk are obtained, so that it is also possible to compensate for deterioration of characteristics with age. As a result, WDM signal lights propagated through n transmission systems $S_1$ though $S_n$ can be Raman amplified with high excitation efficiency and improved stability.

Next is a description of a the embodiment of an optical repeater using Raman amplification according to the present invention.

In the sixth embodiment, for the basic structure shown in the abovementioned first embodiment, an optical repeater using Raman amplification in which another improvement is made to achieve stability of the Raman amplification operation will be described.

Figure 12:
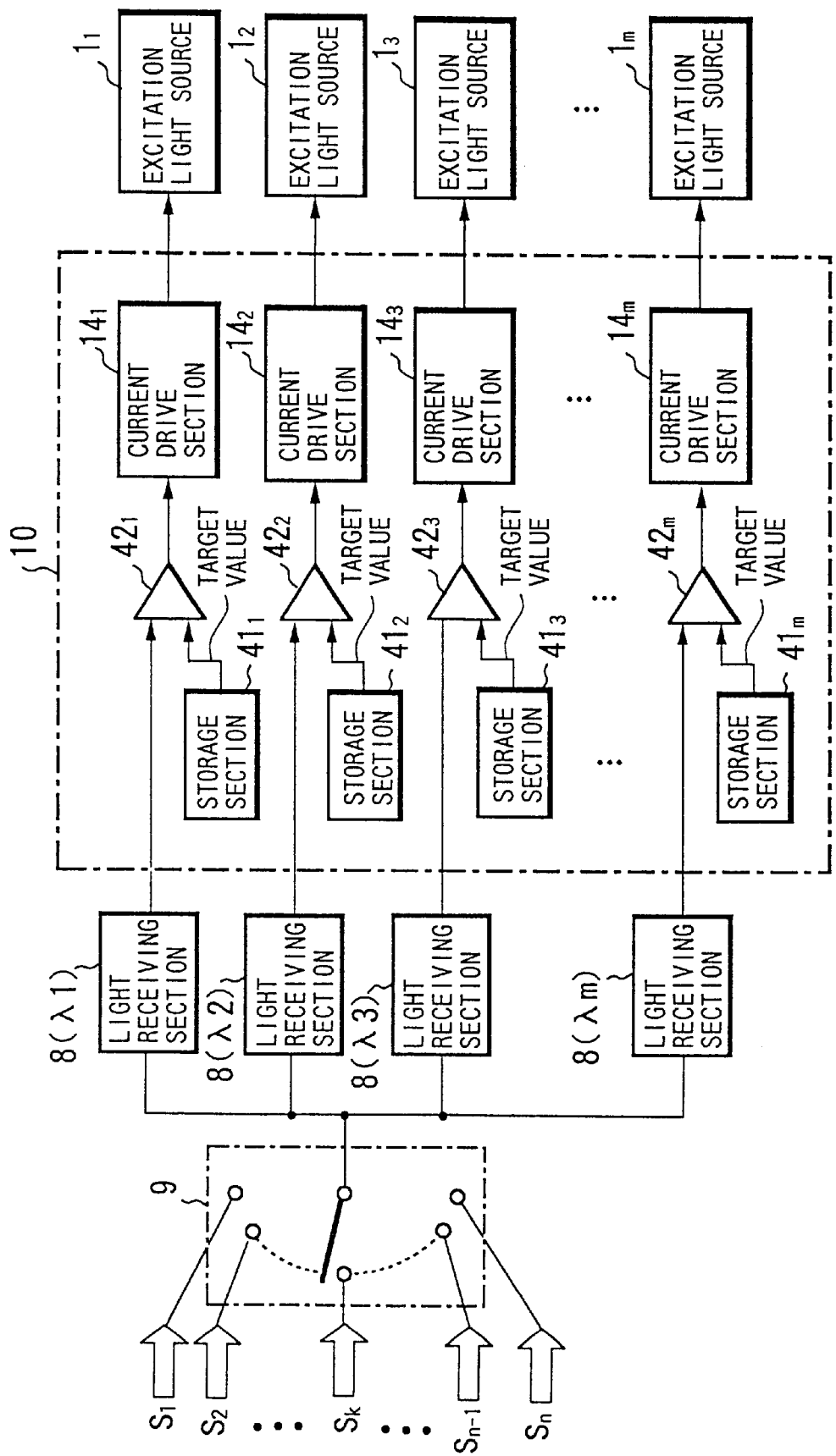
FIG. 12 shows a structure of the main parts of an optical repeater using Raman amplification according to a sixth embodiment of the present invention.

FIG. 12 is a block diagram showing a structure of the main parts of an optical repeater using Raman amplification according to the sixth embodiment. Here, the overall structure of the optical repeater using Raman amplification is basically the same as that of the second embodiment shown in FIG. 3 described above. However, in the present embodiment also, a case is considered where the basic structure of an optical repeater using Raman amplification is generalized to m excitation light sources $1_1$ through $1_m$ and n transmission systems $S_1$ through $S_n$.

FIG. 12, in the optical repeater using Raman amplification of the present embodiment, for n transmission systems $S_1$ through $S_n$, the monitor lights obtained by branching a part of each WDM signal light after Raman amplification by each of optical demultiplexers, are sent to an optical switch 9 where any one of the n monitor lights corresponding to the transmission systems $S_1$ through $S_n$ is selected. The monitor light selected by the optical switch 9 is sent to the light receiving sections 8(λ1) through 8(λm) corresponding to the wavelength bands λ1 through λm of the signal lights controlled by the excitation light sources $1_1$ through $1_m$. In the light receiving sections 8(λ1) through 8(λm), the corresponding optical powers of the wavelength bands λ1 through λm components are monitored for the monitor light from the optical switch 9, and the monitored result is transmitted to comparison sections $42_1$ through $42_m$ corresponding to the wavelength bands λ1 through λm. Here, the specific structure of the light receiving sections 8(λ1) through 8(λm) is the same as in the case of the fourth embodiment shown in FIG. 10 mentioned previously.

In the comparison sections $42_1$ through $42_m$, the optical powers output from the light receiving sections 8(λ1) through 8(λm) and the target values stored in the storage sections $41_1$ through $41_m$ are compared, and signals indicating differences are output to current drive sections $14_1$ through $14_m$. Here, in the storage sections $41_1$ through $41_m$, target values of optical powers monitored in the light receiving sections 8(λ1) through 8(λm) are stored corresponding to relevant wavelength bands. In the current drive sections $14_1$ through $14_m$, similarly to the case of the second embodiment, according to the difference signals output from the comparison sections $42_1$ through $42_m$, values of drive current to be supplied to the excitation light sources $1_1$ through $1_m$ are increased or decreased. As a result, for the transmission system corresponding to the monitor light selected by the optical switch 9, the excitation light power of the wavelengths $\lambda_{P1}$ through $\lambda_{Pm}$ generated by the excitation light sources $1_1$ through $1_m$ are feedback controlled such that the optical powers of the wavelength bands λ1 through λm approach The target value, respectively.

According to the optical repeater using Raman amplification having a structure as described above, for example, for WDM signal lights of a transmission system to be noticed, the deviation in the optical power levels corresponding to the wavelength bands λ1 through λm can be corrected before being highly enlarged. Furthermore, it is possible to select arbitrarily the transmission system to be noticed by switching the optical switch 9, and it is also possible to adopt an application in which the transmission system to be noticed is switched by remote control from a terminal station by cooperating with the supervisory control functions of a transmission system in which the present optical repeater using Raman amplification is applied.

Figure 13:
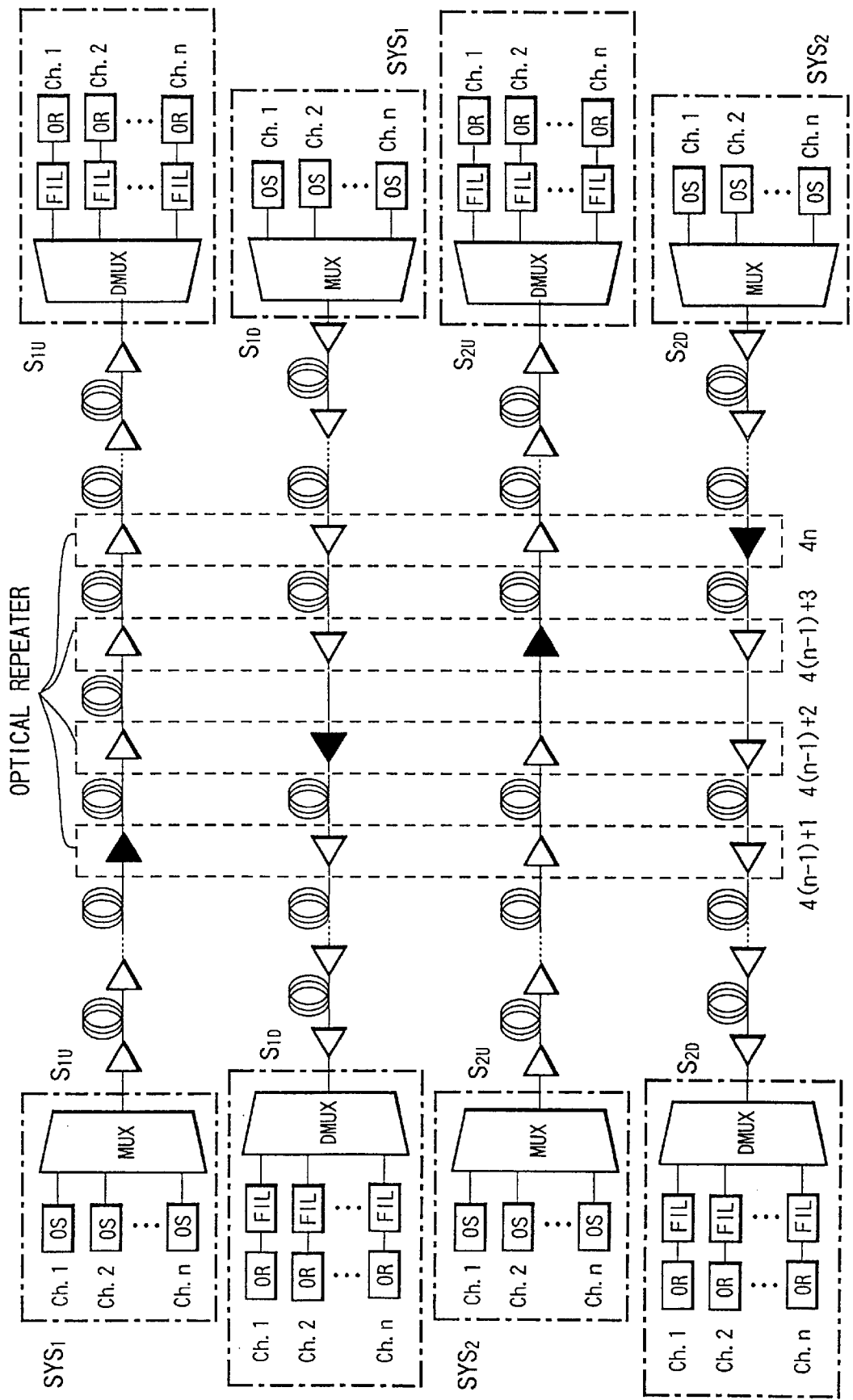
FIG. 13 shows a structural example of a WDM optical transmission system in which optical repeaters using Raman amplification of the sixth embodiment are applied.

FIG. 13 shows a structural example of a WDM optical transmission system in which the optical repeaters using Raman amplification of the abovementioned sixth embodiment are applied.

The WDM optical transmission system in the structural example of FIG. 13 shows one example of a two fiber pair system. The optical repeaters using Raman amplification of the abovementioned sixth embodiment are used as optical repeaters, each enclosed by a dotted line in the figure, for collectively amplifying WDM signal lights propagated through ascending transmission systems $S_{1U}$ and $S_{2U}$ and descending transmission systems $S_{1D}$ and $S_{2D}$ of fiber pair lines $SYS_1$ and $SYS_2$ respectively. Here, the system construction is such that a feedback control of the excitation light powers of the transmission systems $S_{1U}$, $S_{1D}$, $S_{2U}$ and $S_{2D}$ is performed with four optical repeaters as one unit.

To be specific, for example, a (4(n−1)+1)th optical repeater (where n≧1) selects a monitor light corresponding to the ascending transmission system $S_{1U}$ of the fiber pair line $SYS_1$ using the optical switch 9 to perform the feedback control of excitation light power. Furthermore, a (4(n−1)+2)th optical repeater selects a monitor light corresponding to the descending transmission system $S_{1D}$ of the fiber pair line $SYS_1$ using the optical switch 9 to perform the feedback control of excitation light power. Moreover, a (4(n−1)+3)th optical repeater selects monitor light corresponding to the ascending transmission system $S_{2U}$ of the fiber pair line $SYS_2$ using the optical switch 9 to perform the feedback control of excitation light power. In addition, a (4n)th optical repeater selects a monitor light corresponding to the descending transmission system $S_{2D}$ of the fiber pair line $SYS_2$ using the optical switch 9 to perform the feedback control of excitation light power. As a result, the parameters of all of the transmission systems $S_{1U}$, $S_{1D}$, $S_{2U}$ and $S_{2D}$ are corrected at least once in every four optical repeaters.

Next is a description of a seventh embodiment of an optical repeater using Raman amplification according to the present invention.

In the seventh embodiment, a modified example of the controller 10 used in the optical repeater using Raman amplification of the sixth embodiment is described.

Figure 14:
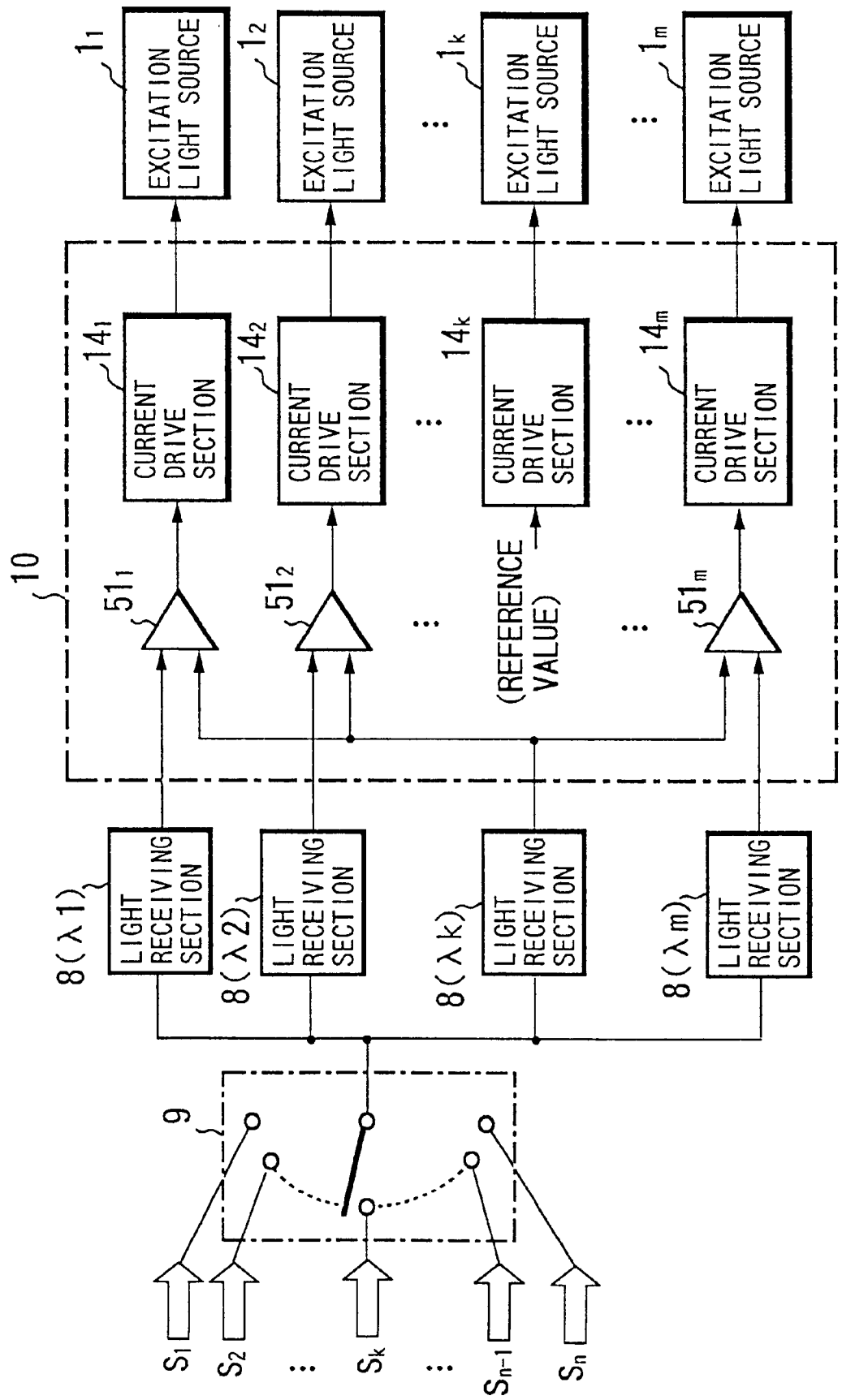
FIG. 14 shows a specific structural example of a controller used in an optical repeater using Raman amplification according to a seventh embodiment of the present invention.
Figure 15:
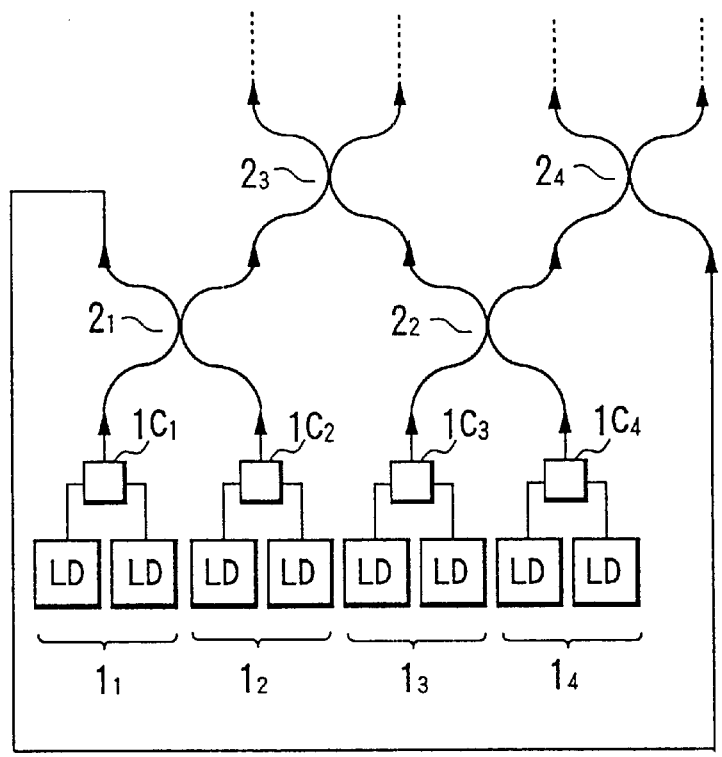
FIG. 15 shows a structural example of a case where polarization combined excitation light is provided to a star coupler, with regard to each embodiment of the present invention.

FIG. 14 is a block diagram showing a structural example of a controller used in the optical repeater using Raman amplification of the seventh embodiment.

In FIG. 14, in a controller 10 used in the optical repeater using Raman amplification of the present embodiment, similarly to the case of the fifth embodiment mentioned above, the reference excitation light source $1_k$ is set, and for a monitor light of the transmission system selected by the optical switch 9, the optical power monitored by the light receiving section $8(\lambda k)$ corresponding to the wavelength band $\lambda k$ of an optical signal controlled by the reference excitation light source $1_k$, and the optical powers monitored by the other light receiving sections, are compared by comparison sections $51_1$ through $51_m$, and differences between the optical power of the reference wavelength band $\lambda k$ and the optical powers of the other wavelength bands are obtained.

Then, the difference values obtained by the comparison sections $51_1$ through $51_m$ are input to corresponding current drive sections $14_1$ through $14_m$ respectively, and values of drive current to be applied to the excitation light sources $1_1$ through $1_m$ are increased or decreased according to the difference values input. Here, for example, a reference value set in advance is applied to the current drive section $14_k$ corresponding to the reference excitation light source $1_k$, to supply a constant drive current to the excitation light source $1_k$. As a result, in the transmission system corresponding to the monitor light selected by the optical switch 9, the excitation light powers of the wavelengths $\lambda_{P1}$ through $\lambda_{Pm}$ generated in the excitation light sources $1_1$ through $1_m$ are feedback controlled such that the optical powers of the other wavelength bands approach the optical power of the reference wavelength band $\lambda k$.

In this manner, also in the optical amplification repeater of the seventh embodiment, the same effect as in the case of the sixth embodiment can be obtained, and further, since the differences between the optical power of the reference wavelength band $\lambda k$ and the optical powers of the other wavelength bands are obtained, it is also possible to compensate for the deterioration of characteristics with age. Furthermore, the optical repeater using Raman amplification of the seventh embodiment is suitable as an optical repeater used in the aforementioned WDM optical transmission system shown in FIG. 13.

Here, in the abovementioned sixth and seventh embodiments, the construction is shown such that the monitor lights of the transmission systems $S_1$ through $S_n$ are selected by using the optical switch 9. However, the present invention is not limited to this. In a case where it is possible to fixedly set a transmission system to be noticed according to the arrangement of optical repeaters using Raman amplification and the like, the optical switch 9 may be omitted to input the monitor lights of the transmission systems directly to the light receiving sections $8(\lambda 1)$ through $8(\lambda m)$.

Furthermore, in the abovementioned second through seventh embodiments, the excitation light powers are controlled respectively by increasing or decreasing the values of the drive current to be applied to the excitation light sources. However, the measure of controlling excitation light power is not limited to this. For example, it is also possible to control the power of excitation light input to the star coupler by inserting a variable optical attenuator in a post stage of the output port of each excitation light source to change an optical attenuation amount of the variable optical attenuator according to the control signal from the controller.

Figure 16:
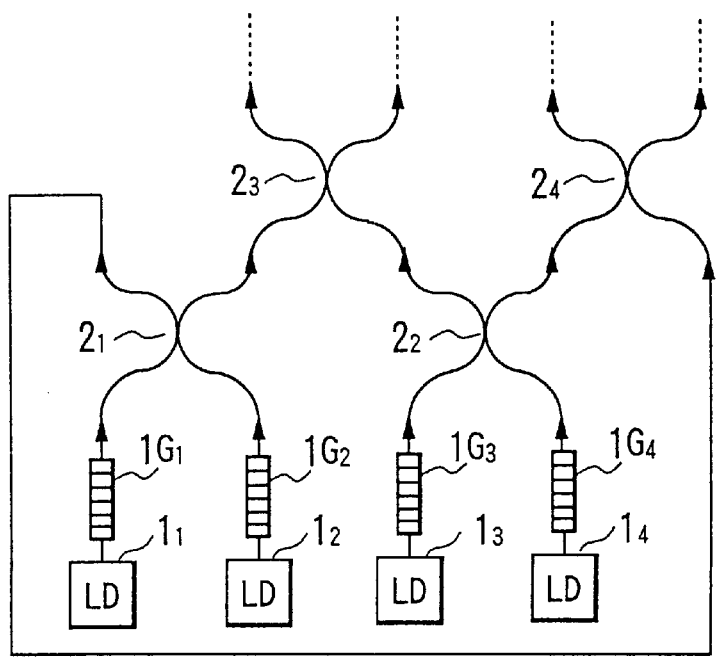
FIG. 16 shows a structural example of a case where excitation light wavelengths are stabilized by using optical fiber Bragg grating filters, with regard to each embodiment of the present invention.

Moreover, in the abovementioned first through seventh embodiments, the construction is such that the excitation lights respectively output from the excitation light sources are guided directly to the input ports of the star coupler. However, the present invention is not limited to this. For example, as shown in FIG. 16, as the excitation light sources $1_1$ through $1_4$, the consideration is given to a combination of two excitation light sources that generate excitation lights of almost equal wavelengths and orthogonal polarization states, and the excitation lights output from each pair of excitation light sources are polarization combined by polarization combiners $1C_1$ through $1C_4$ to be sent to the input ports of the star coupler 2. In this case, polarization dependency of Raman gain can be solved, and it is also possible to increase the excitation light powers to be applied to the input ports of the start coupler 2. Furthermore, as shown in FIG. 16, for example, the arrangement may be such that optical fiber Bragg gratings $1G_1$ through $1G_4$ are inserted between the output ports of the excitation light sources $1_1$ through $1_4$ and the input ports of the star coupler 2 to achieve stability of the excitation light wavelengths. Here, for the optical fiber Bragg gratings $1G_1$ through $1G_4$, it is preferable to use ones that have a low reflection rate (for example, <1–15%) at a narrow brand (for example, 3 dB bandwidth<1 nm) with the oscillation wavelength of the corresponding excitation light source as a center.

Figure 17:
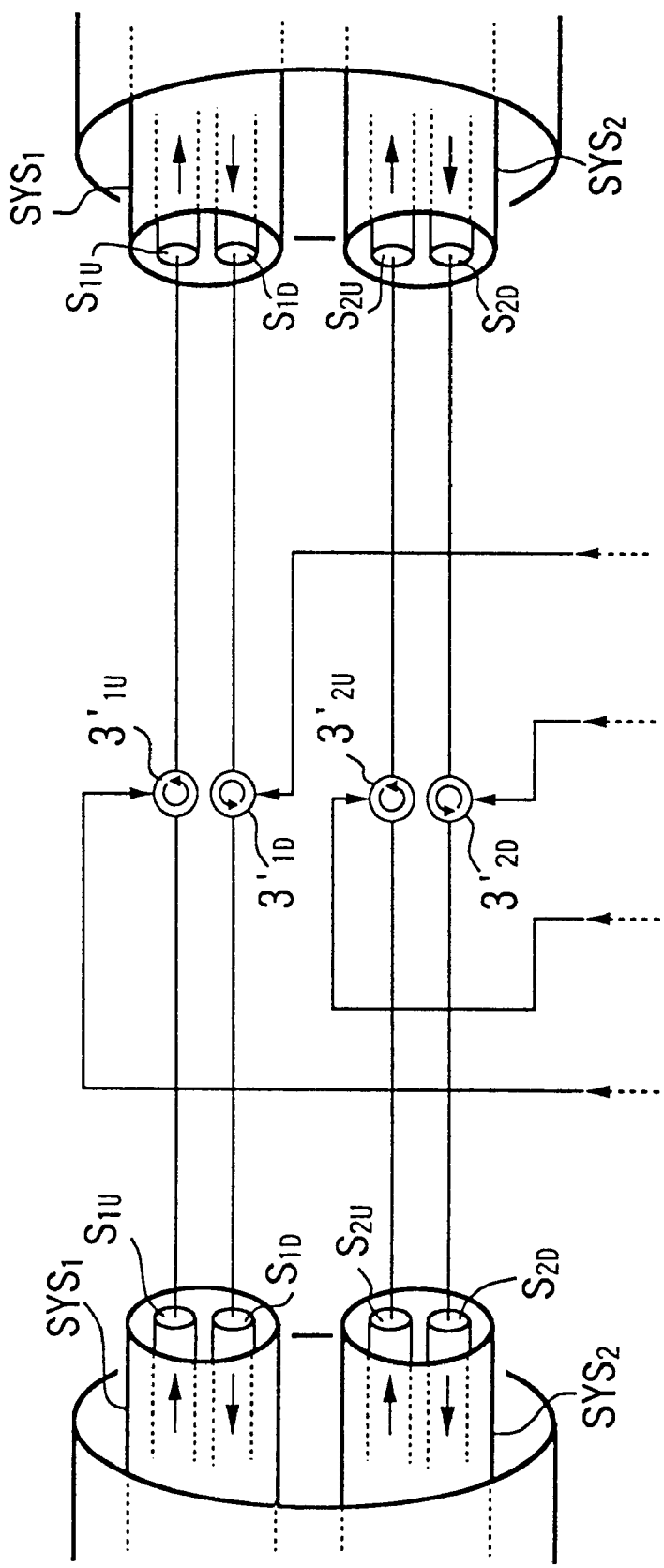
FIG. 17 shows the structure of a case where excitation light is provided to Raman amplification media using optical circulators, with regard to each embodiment of the present invention.
Figure 18:
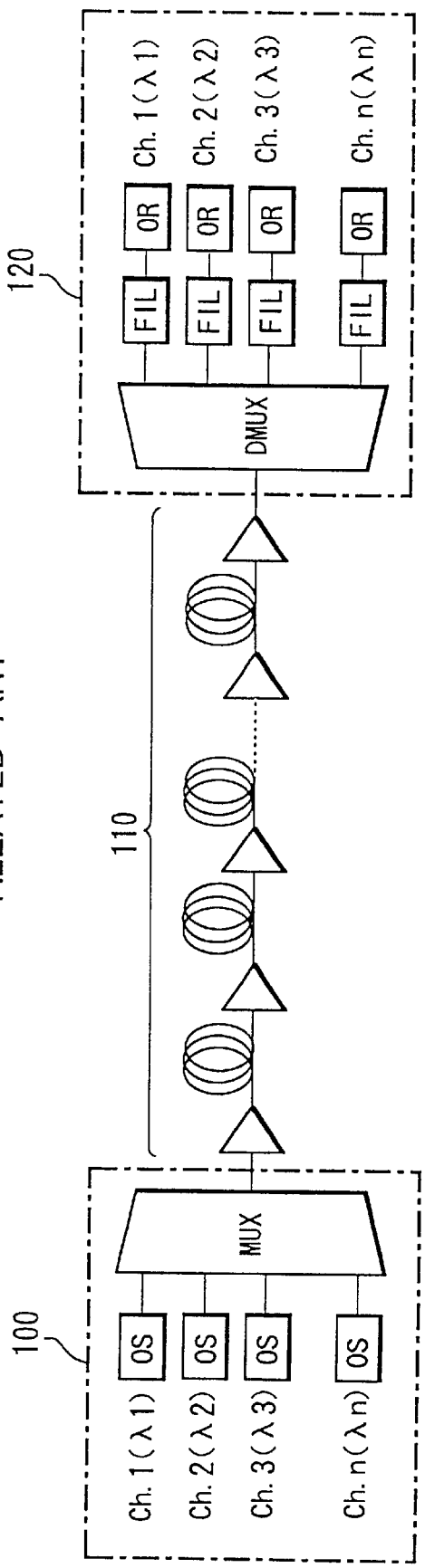
FIG. 18 shows a structural example of a typical WDM optical amplification repeater.

In addition, in the abovementioned first through seventh embodiments, the construction is shown such that the excitation lights output from the star coupler 2 are supplied to the Raman amplification media of the transmission systems by using the optical multiplexers. However, as shown in FIG. 17, for example, optical circulators $3'_{1U}$, $3'_{2U}$, $3'_{1D}$ and $3'_{2D}$ may be used instead of optical multiplexers.

Furthermore, in the optical repeater using Raman amplification according to the present invention, an application is also possible in which, from among the excitation light power control modes that are explained in the abovementioned second through seventh embodiments, two or more excitation light power control modes are combined, and operation is performed by switching the control modes according to the parameter to be noticed. The control mode switching at this time, for example, in a case of an optical repeater having a supervisory control function, may also be performed by the control from the terminal station.

What is claimed:

1. An optical repeater using Raman amplification, which supplies excitation light to a Raman amplification medium of each one of a plurality of transmission systems transmitting wavelength division multiplexed signal lights, and Raman amplifies each wavelength division multiplexed signal light transmitted through each of said transmission systems, comprising:
- a plurality of excitation light generation sections for generating excitation lights of different wavelengths corresponding to the wavelength bands of said wavelength division multiplexed signal lights;
- an optical multiplexing/demultiplexing section having a plurality of input ports corresponding to said respective excitation light generation sections, and a plurality of output ports corresponding to said respective transmission systems, for multiplexing excitation lights input to said input ports from said excitation light generation sections, and demultiplexing the multiplexed excitation light for output from said output ports; and
- a plurality of excitation light multiplexing sections for supplying excitation lights output from the respective output ports of said optical multiplexing/demultiplexing section to the Raman amplification media of said respective transmission systems, respectively.

2. An optical repeater using Raman amplification according to claim 1, further comprising:
- signal light power detecting section for detecting wavelength division multiplexed signal light powers after Raman amplification in said respective transmission systems; and
- a control section for controlling the excitation light power output from said each of the excitation light generation sections based on the detection result of said signal light power detecting section.

3. An optical repeater using Raman amplification according to claim 2, wherein
said signal light power detecting section detects the total optical power of wavelength division multiplexed signal light after Raman amplification in each of said transmission systems, and
said control section is provided with a mean value computation section for computing a mean value of the total optical power of said each transmission system, which is detected in said signal light power detecting section, a comparison section for obtaining a difference between a preset target mean value and the mean value of the total optical power computed in said mean value computation section; and an excitation light power control section for controlling the excitation light power output from each of said excitation generation sections according to the difference value obtained in said comparison section.

4. An optical repeater using Raman amplification according to claim 3, wherein said control section has a correction section for performing weighting correction on the difference value obtained in said comparison section corresponding to each of said excitation light generation sections, and said excitation light power control section controls the excitation light power output from each of said excitation light generation sections according to the value weighting corrected in said correction section.

5. An optical repeater using Raman amplification according to claim 2, wherein
said signal light power detecting section divides the wavelength division multiplexed signal light after Raman amplification in each of said transmission systems into gain wavelength bands corresponding to the excitation light wavelength of each of said excitation light generation sections, and detects the optical powers of said signal lights for each of the gain wavelength bands, and
said control section is provided with a mean value computation section for gathering the optical power for each of the gain wavelength bands in each of said transmission systems detected in said signal light power detecting section and computing a mean value, a comparison section for obtaining a difference between a target mean value set in advance corresponding to the gain wavelength band and the mean value of the optical power for each of the gain wavelength bands computed in said mean value computation section, and an excitation light power control section for controlling the excitation light power output from each of said excitation light generation sections according to the difference value for each of the gain wavelength bands, obtained in said comparison section.

6. An optical repeater using Raman amplification according to claim 2, wherein
said signal light power detecting section divides the wavelength division multiplexed signal light after Raman amplification in each of said transmission systems into gain wavelength bands corresponding to the excitation light wavelength of each of said excitation light generation sections, and detects the optical powers of said signal lights for each of the gain wavelength bands, and
said control section is provided with a comparison section for obtaining, for the optical power of each of said transmission systems detected in said signal light power detecting section, differences of the optical powers of the other gain wavelength bands to the optical power of a reference gain wavelength band set in advance, a mean value computation section for gathering difference values obtained by said comparison section for each of the gain wavelength bands and computing a mean value, and an excitation light power control section for controlling the excitation light power output from each of said excitation light generation sections according to the mean value of the differences of the respective gain wavelength bands, computed in said mean value computation section.

7. An optical repeater using Raman amplification according to either one of claim 5 and claim 6, wherein
said signal light power detecting section selects any one of said plurality of transmission systems and detects the power of the wavelength division multiplexed signal light after Raman amplification, and
said control section controls the power of the excitation light output from each of said excitation light generation sections based only on the detection result for the transmission system selected in said signal light power detecting section.

8. An optical repeater using Raman amplification according to claim 2, wherein
said control section incorporates a function to switch a plurality of control modes that are different to each other in the control method for excitation light power.

9. An optical repeater using Raman amplification according to claim 1, wherein
each of said excitation light generating sections combines and outputs with a polarization combiner the excitation light output from each of the plurality of excitation light sources.

10. An optical repeater using Raman amplification according to claim 1, wherein
each of said excitation light generating sections includes an optical fiber Bragg grating filter of a narrow band corresponding to the excitation light wavelength.

11. An optical repeater using Raman amplification according to claim 1, wherein
said optical multiplexing/demultiplexing section is a star coupler constructed by combining optical couplers of 2×2 ports having a predetermined branching ratio.

12. An optical repeater using Raman amplification according to claim 1, wherein
said optical repeater using Raman amplification is of a distributed Raman amplification construction in which an optical transmission path of each of said transmission systems connected to each of said excitation light multiplexing sections is a Raman amplification medium.

13. An optical repeater using Raman amplification according to claim 1, wherein
said optical repeater using Raman amplification is of a lumped type Raman amplification construction in which a Raman amplification medium is connected between each of said excitation light multiplexing sections and an optical transmission path of each of said transmission systems.

14. An optical repeater using Raman amplification according to claim 1, wherein
rare earth element doped optical fiber amplifiers for amplifying wavelength division multiplexed signal lights transmitted through said transmission systems are combined with each other.

15. A wavelength division multiplexed light transmission system, comprising a plurality of transmission systems for transmitting wavelength division multiplexed signal lights between transmitting terminals and receiving terminals, and an optical repeater on an optical transmission path of each of said transmission systems, wherein
said optical repeater has an optical repeater using Raman amplification according to claim 1.

16. A wavelength division multiplexed light transmission system, comprising a plurality of transmission systems for transmitting wavelength division multiplexed signal lights between transmitting terminals and receiving terminals, and a plurality of optical repeaters on an optical transmission path of each of said transmission systems, wherein
said plurality of optical repeaters have optical repeaters using Raman amplification according to claim 7, and the optical repeaters of a number corresponding to said plurality of transmission systems is made one unit to control excitation light power by sequentially selecting each of said transmission systems.

17. An excitation light supply method for supplying excitation light to a Raman amplification medium of each one of a plurality of transmission systems transmitting wavelength division multiplexed signal lights, when Raman amplifying each wavelength division multiplexed signal light transmitted through each of said transmission systems, comprising:
generating a plurality of excitation lights of different wavelengths corresponding to the wavelength bands of said wavelength division multiplexed signal lights;
multiplexing said generated plurality of excitation lights, and then demultiplexing the multiplexed excitation light to a number corresponding to said plurality of transmission systems; and
supplying each of said demultiplexed excitation lights to the Raman amplification medium of each of said transmission systems.

18. An excitation light supply method for supplying excitation light to a Raman amplification medium of each one of a plurality of transmission systems transmitting wavelength division multiplexed signal lights, when Raman amplifying each wavelength division multiplexed signal light transmitted through each of said transmission systems, comprising:
generating a plurality of excitation lights of different wavelengths corresponding to the wavelength bands of said wavelength division multiplexed signal lights;
multiplexing said generated plurality of excitation lights, and then demultiplexing the multiplexed excitation light to a number corresponding to said plurality of transmission systems;
supplying each of said demultiplexed excitation lights to the Raman amplification medium of each of said transmission systems;
detecting the power of wavelength division multiplexed signal light amplified by the Raman amplification medium of each of said transmission systems; and
controlling the power of each of said generated excitation lights based on said detected wavelength division multiplexed signal light power of each of said transmission systems.

* * * * *